US010681322B2

(12) United States Patent
Arii

(10) Patent No.: US 10,681,322 B2
(45) Date of Patent: *Jun. 9, 2020

(54) SOLID STATE IMAGING DEVICE AND IMAGING APPARATUS HAVING A PLURALITY OF ADDITION READ MODES

(71) Applicant: NIKON CORPORATION, Tokyo (JP)

(72) Inventor: Taku Arii, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/191,866

(22) Filed: Nov. 15, 2018

(65) Prior Publication Data
US 2019/0089937 A1 Mar. 21, 2019

Related U.S. Application Data

(63) Continuation of application No. 14/643,830, filed on Mar. 10, 2015, now Pat. No. 10,171,784, which is a (Continued)

(30) Foreign Application Priority Data

Aug. 11, 2010 (JP) ................................. 2010-180391

(51) Int. Cl.
H04N 5/335 (2011.01)
H04N 9/73 (2006.01)
(Continued)

(52) U.S. Cl.
CPC ............. *H04N 9/73* (2013.01); *H04N 5/347* (2013.01); *H04N 5/3456* (2013.01);
(Continued)

(58) Field of Classification Search
CPC ....................................................... H04N 9/73
(Continued)

(56) References Cited

U.S. PATENT DOCUMENTS 9,007,498 B2 4/2015 Arii
2003/0107586 A1* 6/2003 Takiguchi ............. G06T 3/4038
345/629
(Continued)

FOREIGN PATENT DOCUMENTS

JP 2004-274306 A 9/2004
JP 2006-166074 A 6/2006
(Continued)

OTHER PUBLICATIONS

Jun. 19, 2012 Notification of Reasons for Refusal issued in Japanese Application No. 2010-180391.
(Continued)

*Primary Examiner* — Usman A Khan
(74) *Attorney, Agent, or Firm* — Oliff PLC

(57) ABSTRACT

A plurality of kinds of color filters are disposed at each of pixels in accordance with a color array of two rows and two columns at a pixel section of a solid state imaging device. A first signal outputting circuit and a second signal outputting circuit each perform an addition read of electrical signals from the pixels of one/the other color included in a line to be read. An addition controlling circuit shifts sampling positions of the pixels which are added at a time of the addition read by a unit of the color array between the first signal outputting circuit and a second signal outputting circuit.

5 Claims, 19 Drawing Sheets

Related U.S. Application Data continuation of application No. 13/206,109, filed on Aug. 9, 2011, now Pat. No. 9,007,498.

(51) Int. Cl.
  *H04N 9/04* (2006.01)
  *H04N 5/345* (2011.01)
  *H04N 5/378* (2011.01)
  *H04N 5/347* (2011.01)

(52) U.S. Cl.
  CPC .......... *H04N 5/378* (2013.01); *H04N 9/045* (2013.01); *H04N 9/04511* (2018.08)

(58) Field of Classification Search
  USPC ................................ 348/280, 281, 224.1
  See application file for complete search history.

(56) References Cited

U.S. PATENT DOCUMENTS

| | | | |
|---|---|---|---|
| 2007/0070232 A1 | 3/2007 | Takayama et al. | |
| 2007/0120985 A1 | 5/2007 | Hashimoto | |
| 2007/0229686 A1* | 10/2007 | Hiyama | H04N 5/3456 348/294 |
| 2008/0002038 A1 | 1/2008 | Suwa | |
| 2008/0030605 A1 | 2/2008 | Tsukimura et al. | |
| 2009/0256939 A1 | 10/2009 | Sonoda | |
| 2011/0102663 A1* | 5/2011 | Ichimiya | G02B 7/36 348/345 |

FOREIGN PATENT DOCUMENTS

| | | |
|---|---|---|
| JP | 2007-129581 A | 5/2007 |
| JP | 2007-174478 A | 7/2007 |

OTHER PUBLICATIONS

Oct. 2, 2012 Office Action issued in Japanese Application No. 2010-180391.
Sep. 11, 2013 Office Action issued in U.S. Appl. No. 13/206,109.
May 13, 2014 Office Action issued in U.S. Appl. No. 13/206,109.
Nov. 5, 2015 Office Action issued in Chinese Application No. 201110235555.0.
Sep. 16, 2015 Office Action issued in U.S. Appl. No. 14/643,830.
Mar. 30, 2016 Office Action issued in U.S. Appl. No. 14/643,830.
Sep. 14, 2016 Office Action issued in U.S. Appl. No. 14/643,830.
Mar. 15, 2017 Office Action issued in U.S. Appl. No. 14/643,830.
Aug. 28, 2017 Office Action issued in U.S. Appl. No. 14/643,830.
Mar. 2, 2018 Office Action issued in U.S. Appl. No. 14/643,830.
Aug. 15, 2018 Notice of Allowance issued in U.S. Appl. No. 14/643,830.

* cited by examiner

| | ADD_CNT | PIX2ADD | LINE TO BE READ | LINE_SELECT0 | LINE_SELECT1 | REGISTER CIRCUIT TO WHICH READ INSTRUCTION SIGNAL IS INPUT |
|---|---|---|---|---|---|---|
| NON-ADDITION READ MODE | LOW-LEVEL (L) | LOW-LEVEL (L) | ODD NUMBER ROW (Gb/B) | LOW-LEVEL (L) | HIGH-LEVEL (H) | UPPER SIDE: SR0<br>LOWER SIDE: SR0 |
| | | | EVEN NUMBER ROW (R/Gr) | HIGH-LEVEL (H) | LOW-LEVEL (L) | UPPER SIDE: SR0<br>LOWER SIDE: SR0 |
| FIRST ADDITION READ MODE | HIGH-LEVEL (H) | LOW-LEVEL (L) | ODD NUMBER ROW (Gb/B) | LOW-LEVEL (L) | HIGH-LEVEL (H) | UPPER SIDE: SR0-2<br>LOWER SIDE: SR1-3 |
| | | | EVEN NUMBER ROW (R/Gr) | HIGH-LEVEL (H) | LOW-LEVEL (L) | UPPER SIDE: SR1-3<br>LOWER SIDE: SR0-2 |
| SECOND ADDITION READ MODE | HIGH-LEVEL (H) | HIGH-LEVEL (H) | ODD NUMBER ROW (Gb/B) | LOW-LEVEL (L) | HIGH-LEVEL (H) | UPPER SIDE: SR0, SR2<br>LOWER SIDE: SR1, SR3 |
| | | | EVEN NUMBER ROW (R/Gr) | HIGH-LEVEL (H) | LOW-LEVEL (L) | UPPER SIDE: SR1, SR3<br>LOWER SIDE: SR0, SR2 |

FIG.4

SOLID STATE IMAGING DEVICE AND IMAGING APPARATUS HAVING A PLURALITY OF ADDITION READ MODES

CROSS REFERENCE TO THE RELATED APPLICATIONS

This is a Continuation of U.S. patent application Ser. No. 14/643,830 filed Mar. 10, 2015, which in turn is a Continuation of U.S. patent application Ser. No. 13/206,109 filed Aug. 9, 2011 (now U.S. Pat. No. 9,007,498), which claims the benefit of priority from Japanese Patent Application No. 2010-180391, filed on Aug. 11, 2010. The entire contents of each of the above-identified applications are incorporated herein by reference.

BACKGROUND

1. Field

The present embodiments relate to a solid state imaging device and an imaging apparatus.

2. Description of the Related Art

Conventionally, an XY address type solid state imaging device in which signals of respective pixels are read in parallel by each color by using plural signal outputting circuits is known (refer to Japanese Unexamined Patent Application Publication No. 2007-174478 as an example). Besides, it is general that a primary color filter is disposed at a pixel section in, for example, a Bayer array to capture a color image in the solid state imaging device.

Incidentally, when an addition read of an image signal is performed by the solid state imaging device, it is necessary to determine a barycenter position of each color pixel after the addition in consideration of a color array at the color filter. However, it is difficult to read the image signal added by each color from each channel without displacement of the barycenter position of each color pixel after the addition in a general XY address type solid state imaging device.

SUMMARY

A solid state imaging device according to an aspect includes a pixel section in which a plurality of pixels converting incident light into electrical signals are arranged in a matrix state, a plurality of kinds of color filters, a first signal outputting circuit, a second signal outputting circuit, and an addition controlling circuit. The plurality of kinds of color filters each transmits light of different color component and are disposed at each of the pixels in accordance with a color array of two rows and two columns. The first signal outputting circuit performs an addition read of the electrical signals from the pixels of one color included in a line to be read of the pixel section. The second signal outputting circuit performs the addition read of the electrical signals from the pixels of the other color included in the line to be read. The addition controlling circuit shifts sampling positions of the pixels which are added at a time of the addition read by a unit of the color array between the first signal outputting circuit and the second signal outputting circuit.

In the above-stated aspect, the first signal outputting circuit and the second signal outputting circuit may each include a shift register sequentially specifying the pixels to be addition read at the line to be read. Besides, the addition controlling circuit may shift a reading start position by the shift register of the first signal outputting circuit and a reading start position by the shift register of the second signal outputting circuit.

In the above-stated aspect, the addition controlling circuit may be able to select a first addition read mode and a second addition read mode in which barycenter positions of the pixels after the addition may match each other and of which a number of the pixels to be added differs from one another.

The solid state imaging device according to the above-stated aspect may further include dummy pixels. The dummy pixels are provided at one end of the line to be read and compensate lacking pixels at the time of the addition read at the first signal outputting circuit and the second signal outputting circuit.

An imaging apparatus according to an aspect, includes the solid state imaging device according to the above-stated aspect and a controlling section. The controlling section instructs the solid state imaging device to perform an all pixel reading at a time of a still image acquisition, and instructs the solid state imaging device to perform the addition read at a time of a moving image acquisition.

BRIEF DESCRIPTION OF THE DRAWINGS

FIG. 4 is a view illustrating a correspondence of control signals and read instruction signals in each operation mode.

DETAILED DESCRIPTION OF THE EMBODIMENTS

Description of One Embodiment

Figure 1:
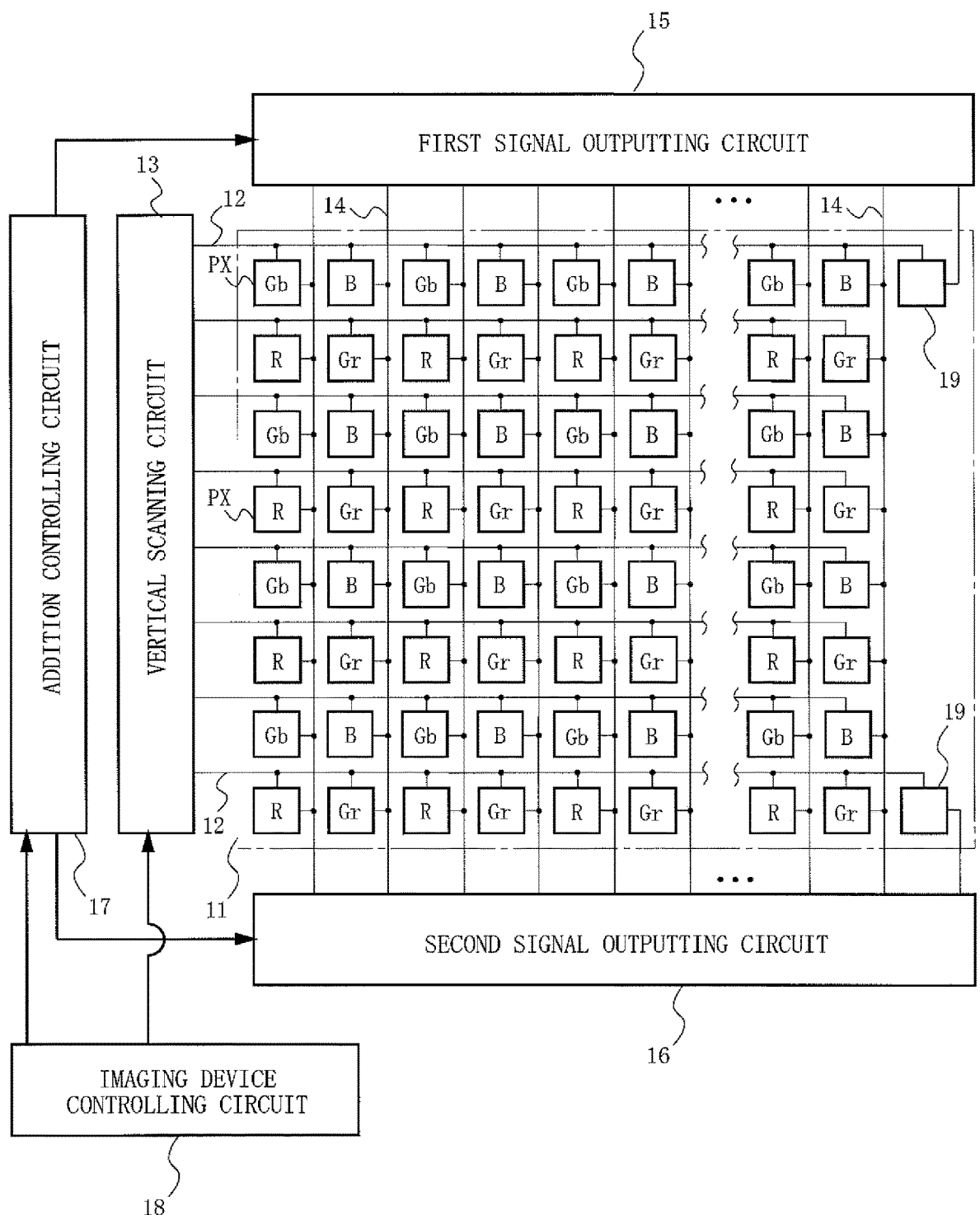
FIG. 1 is a block diagram illustrating a configuration example of a solid state imaging device in one embodiment.

FIG. 1 is a block diagram illustrating a configuration example of a solid state imaging device in one embodiment. The solid state imaging device in the one embodiment is an XY address type solid state imaging device formed by using a CMOS (Complementary Metal Oxide Semiconductor) process on a silicon substrate. The solid state imaging device in the one embodiment is mounted on imaging apparatuses such as, for example, a digital still camera and a video camera (a configuration example of the imaging apparatus is described later).

Besides, the solid state imaging device of the one embodiment includes an operation mode performing an addition read of electrical signals from plural pixels (addition read mode) and an operation mode which does not perform the above-stated pixel addition (non-addition read mode). Besides, the solid state imaging device of the one embodiment is able to select a first addition read mode adding signals for three pixels and a second addition read mode adding signals for two pixels as a sub mode of the addition read mode.

The solid state imaging device includes a pixel section 11, plural horizontal control signal lines 12, a vertical scanning circuit 13, plural vertical signal lines 14, a first signal outputting circuit 15, a second signal outputting circuit 16, an addition controlling circuit 17, and an imaging device controlling circuit 18.

The pixel section 11 includes plural pixels PX converting incident light into electrical signals. The pixels PX of the pixel section 11 are arranged in a matrix state on a light-receiving surface. Note that an array of the pixels PX is simplified to be illustrated in FIG. 1, but it goes without saying that a number of pixels are further arranged on the light-receiving surface of an actual solid state imaging device. Besides, dummy pixels 19 are disposed one by one at upward and downward of one end of the pixel section 11 (at a left side in FIG. 1). Basic configurations of these dummy pixels 19 are the same as the pixel PX, and it is used in the addition read mode.

Besides, the horizontal control signal lines 12 coupled to the vertical scanning circuit 13 are each disposed at each row of the pixel section 11. Each horizontal control signal line 12 supplies pulse signals (later-described selection pulse φSEL, reset pulse φRES, transfer pulse φTX output from the vertical scanning circuit 13 to each of pixel groups arranged in a horizontal direction (lateral direction) of FIG. 1.

Besides, each vertical signal line 14 is disposed at each column of the pixel section 11. Each vertical signal line 14 reads a pixel signal from a pixel group arranged in a vertical direction (longitudinal direction) in FIG. 1. Note that an upper end of each vertical signal line 14 is coupled to the first signal outputting circuit 15, and a lower end of each vertical signal line 14 is coupled to the second signal outputting circuit 16.

Here, plural kinds of color filters each transmitting different color component light are disposed in a predetermined color array at a front surface of each pixel PX. Accordingly, the pixel PX outputs the electrical signal corresponding to each color by a color separation at the color filter. For example, color filters of red (R), green (Gr, Gb), and blue (B) are disposed at each pixel PX in accordance with the Bayer array in two rows and two columns in the one embodiment. Namely, the color filters of Gb, B are alternately arranged at odd number rows of the pixel section 11, and the filters of R, Gr are alternately arranged at even number rows of the pixel section 11. The green filters are disposed to make a checkered pattern as a whole of the pixel section 11. The pixel section 11 is thereby able to acquire a color image at an image capturing time. Note that the color of the color filter is also illustrated at each pixel PX in FIG. 1.

Figure 2:
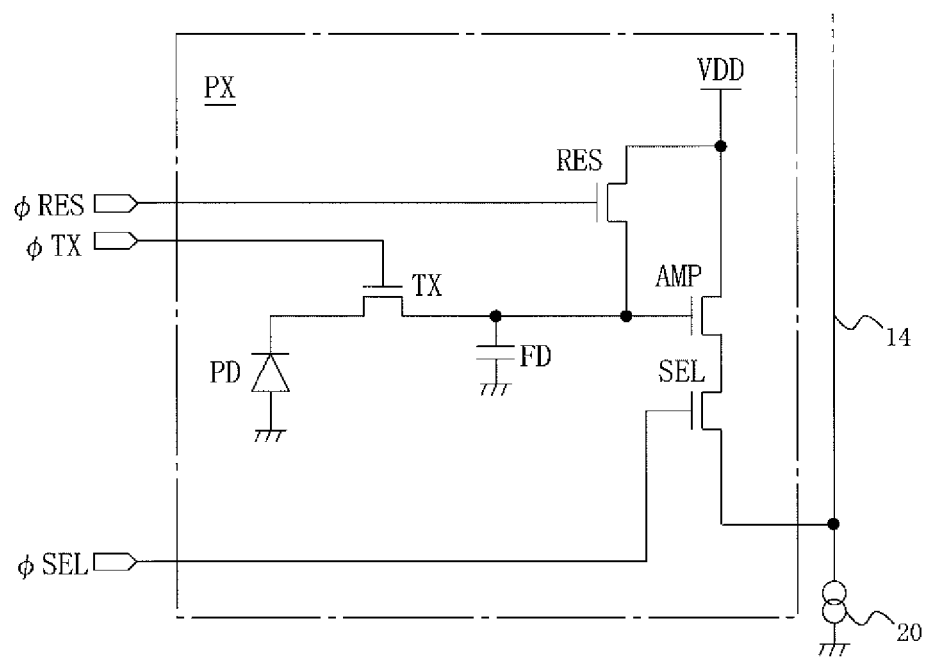
FIG. 2 is a view illustrating a circuit configuration example of a pixel PX.

FIG. 2 is a view illustrating a circuit configuration example of the pixel PX. Note that all of the configurations of the pixels PX illustrated in FIG. 1 are all common.

The pixel PX each includes a photo diode PD, a transfer transistor TX, a reset transistor RES, an amplifier transistor AMP, a selection transistor SEL, and a floating diffusion FD.

The photo diode PD generates an electric charge of signal by a photoelectric conversion in accordance with light intensity of incident light. The transfer transistor TX is turned on during a high-level period of the transfer pulse φTX, and transfers the electric charge of signal accumulated on the photo diode PD to the floating diffusion FD.

A source of the transfer transistor TX is the photo diode PD, and a drain of the transfer transistor TX is the floating diffusion FD. The floating diffusion FD is, for example, a diffusion region formed by introducing impurities into a semiconductor substrate. Note that the floating diffusion FD is coupled to each of a gate of the amplifier transistor AMP and a source of the reset transistor RES.

The reset transistor RES is turned on during a high-level period of the reset pulse φRES, and resets the floating diffusion FD to a power supply voltage VDD. Besides, a drain is coupled to the power supply voltage VDD, and a gate is coupled to the floating diffusion FD, and a source is coupled to a drain of the selection transistor SEL respectively in the amplifier transistor AMP, and the amplifier transistor AMP constitutes a source follower circuit of which load is a constant-current source 20 (not-illustrated in FIG. 1) coupled to the vertical signal line 14. The amplifier transistor AMP outputs a read current via the selection transistor SEL in accordance with a voltage value of the floating diffusion FD. The selection transistor SEL is turned on during a high-level period of the selection pulse φSEL, and couples the source of the amplifier transistor AMP to the vertical signal line 14.

Returning to FIG. 1, the first signal outputting circuit 15 is disposed at an upper side of the pixel section 11 in the drawing, and the second signal outputting circuit 16 is disposed at a lower side of the pixel section 11 in the drawing. The first signal outputting circuit 15 is a circuit reading the image signal of Gr or Gb from the pixel section 11 toward a horizontal direction by each color. Besides, the second signal outputting circuit 16 is a circuit reading the image signals of R or B from the pixel section 11 toward the horizontal direction by each color.

The addition controlling circuit 17 switches between the addition read mode and the non-addition read mode. Besides, the addition controlling circuit 17 shifts a sampling position of the pixels added at the addition read time toward the horizontal direction of the pixel section 11 between the first signal outputting circuit 15 and the second signal outputting circuit 16 in the addition read mode.

The imaging device controlling circuit 18 supplies control signals instructing a signal reading for the vertical scanning circuit 13 and the addition controlling circuit 17. Here, an HSTR, a LINE_SELECT0, a LINE_SELECT1, an ADD_CNT, and a PIX2ADD are included in the signals supplied to the addition controlling circuit 17. The HSTR is a pulse signal instructing a start of a horizontal scanning period. The LINE_SELECT0 and the LINE_SELECT1 are signals switching a reading column at the first signal outputting circuit 15 and the second signal outputting circuit 16. Besides, the ADD_CNT is a signal switching the addition read mode and the non-addition read mode. Note that there is a case when a control signal indicating a negative logic of the ADD_CNT is represented by "INV_ADD_CNT" in the following description. Besides, the PIX2ADD is a signal switching the first addition read mode and the second addition read mode.

Note that the above-stated respective control signals may be supplied from a controlling section of an imaging apparatus to which the solid state imaging device of the one embodiment is mounted. In this case, it is possible that the imaging device controlling circuit 18 is not provided at the solid state imaging device.

Figure 3:
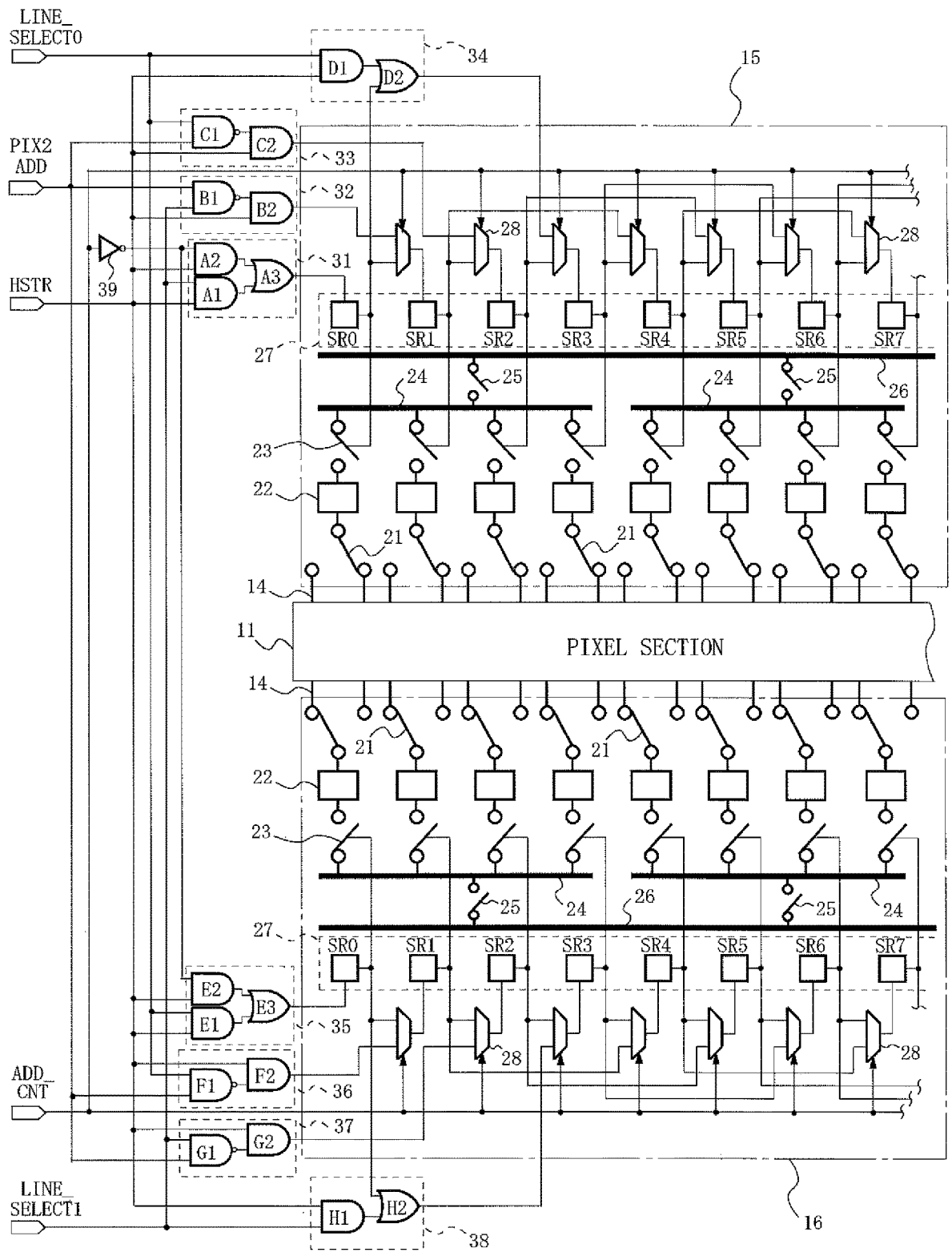
FIG. 3 is a view illustrating a configuration example of a first signal outputting circuit, a second signal outputting circuit, and an addition controlling circuit in the one embodiment.

Hereinafter, configurations of the first signal outputting circuit 15, the second signal outputting circuit 16, and the addition controlling circuit 17 are described in more detail with reference to FIG. 3. Here, basic configurations of the first signal outputting circuit 15 and the second signal outputting circuit 16 are in common. Accordingly, the same reference symbols are used for the common configuration with the first signal outputting circuit 15 and the redundant explanation thereof are not given as for the second signal outputting circuit 16.

The first signal outputting circuit 15 includes column selectors 21, column amplifiers 22, horizontal local switches 23, local horizontal signal lines 24, horizontal global switches 25, global horizontal signal lines 26, a shift register 27, and multiplexers 28.

The column selector 21 is a 2-input 1-output switch disposed one by one by each two columns of a pixel array. The column selector 21 switches inputs from the vertical signal lines 14 at the odd number columns and inputs from the vertical signal lines 14 at the even number columns to output to a subsequent stage. In the column selector 21 of the first signal outputting circuit 15, a contact point with the vertical signal line 14 at the even number column is turned on when the LINE_SELECT0 is in high-level. A contact point with the vertical signal line 14 at the odd number column is turned on when the LINE_SELECT1 is in high-level.

On the other hand, in the column selector 21 of the second signal outputting circuit 16, a contact point with the vertical signal line 14 at the even number column is turned on when the LINE_SELECT1 is in high-level, and a contact point with the vertical signal line 14 at the odd number column is turned on when the LINE_SELECT0 is in high-level.

The column amplifier 22 and the horizontal local switch 23 are coupled in series as a set at each of an output side of each column selector 21 and an output side of a dummy pixel 19. The column amplifier 22 is a MOS transistor receiving a signal current of the pixel PX, and outputting an image signal in accordance with the signal current. Besides, the horizontal local switch 23 turns on/off of coupling between an output of the column amplifier 22 and the local horizontal signal line 24 in accordance with an input of a read instruction signal supplied from the shift register 27.

In the first signal outputting circuit 15, two sets of plural pieces of local horizontal signal lines 24 and one piece of global horizontal signal line 26 are disposed in parallel along a horizontal direction in the drawing. Plural horizontal local switches 23 are coupled to each of the local horizontal signal lines 24. Besides, each of the plural pieces of local horizontal signal lines 24 is coupled to the global horizontal signal line 26 via the horizontal global switch 25. The global horizontal signal line 26 outputs an image signal to an analog front end circuit (not-illustrated in FIG. 1 and FIG. 3) coupled subsequent to the solid state imaging device. It is possible for the first signal outputting circuit 15 to perform high-speed signal reading while reducing parasitic capacitance caused by a horizontal selection switch by using a hierarchical coupling structure as stated above.

The shift register 27 shifts the read instruction signal in the horizontal direction of the pixel section 11, and specifies the switch of which coupling is to be turned on from among the plural horizontal local switches 23. The first signal outputting circuit 15 is able to control a signal to be read of a pixel at which column among a row to be a read object (line to be read) in the pixel section 11 by operations of a line selector and the shift register 27. Note that respective cascade coupled register circuits in the shift register 27 are represented by SR0 to n (the register circuits SR0 to 7 are illustrated in FIG. 3) in the following description.

The multiplexers 28 are each disposed at previous stages of the register circuits SR1 to n. The multiplexer 28 switches an output to the register circuit coupled at the subsequent stage in accordance with an input of the signal ADD_CNT. For example, when the signal ADD_CNT is in low-level, the multiplexer 28 selects an input of a first input terminal. Besides, when the signal ADD_CNT is in high-level, the multiplexer 28 selects an input of a second input terminal.

Here, in the drawing illustrating the multiplexer 28 of the first signal outputting circuit 15, the first input terminal positions at a lower side and the second input terminal positions at an upper side. In the drawing illustrating the multiplexer 28 of the second signal outputting circuit 16, the first input terminal positions at an upper side and the second input terminal positions at a lower side. Besides, when it is represented as "the multiplexer 28 at the m-th stage" in the following description, the m-th multiplexer 28 counted from a left side is indicated. Note that the coupling between the register circuit of the shift register 27 and the multiplexer 28 is described in detail in a description of the addition controlling circuit 17.

The addition controlling circuit 17 includes a first logic circuit group 31 to a fourth logic circuit group 34 outputting the read instruction signal to the shift register 27 of the first signal outputting circuit 15, and a fifth logic circuit group 35 to an eighth logic circuit group 38 outputting the read instruction signal to the shift register 27 of the second signal outputting circuit 16.

At first, configurations of the first logic circuit group 31 to the fourth logic circuit group 34, and a coupling relationship of the register circuit and the multiplexer 28 at the first signal outputting circuit 15 are described.

The first logic circuit group 31 includes an AND circuit A1, an AND circuit A2, and an OR circuit A3. The AND circuit A1 outputs a logical product of the LINE_SELECT1 and the HSTR. The AND circuit A2 outputs a logical product of a negative logic of the ADD_CNT acquired from an inverter 39 and the HSTR. The OR circuit A3 inputs a logical sum of the output of the AND circuit A1 and the output of the AND circuit A2 to the register circuit SR0 of the first signal outputting circuit 15. Note that an output of the register circuit SR0 of the first signal outputting circuit 15 is coupled to the first input terminal of the multiplexer 28 at the first stage and the fourth logical circuit group 34.

The second logic circuit group 32 includes an NAND circuit B1 and an AND circuit B2. The NAND circuit B1 outputs a negative logical product of the PIX2ADD and the LINE_SELECT1. The AND circuit B2 inputs a logical product of the output of the NAND circuit B1 and the HSTR to the second input terminal of the multiplexer 28 at the first stage. Note that an output of the multiplexer 28 at the first stage is coupled to the register circuit SR1 of the first signal outputting circuit 15. An output of the register circuit SR1 of the first of the first signal outputting circuit 15 is coupled to the first input terminal of the multiplexer 28 at the second stage and the second input terminal of the multiplexer 28 at the fourth stage.

The third logic circuit group 33 includes an NAND circuit C1 and an AND circuit C2. The NAND circuit C1 outputs a negative logical product of the PIX2ADD and the LINE_SELECT0. The AND circuit C2 inputs a logical product of the output of the NAND circuit C1 and the HSTR to the second input terminal of the multiplexer 28 at the second stage. Note that an output of the multiplexer 28 at the second stage is coupled to the register circuit SR2 of the first signal outputting circuit 15. An output of the register circuit SR2 of the first signal outputting circuit 15 is coupled to the first input terminal of the multiplexer 28 at the third stage and the second input terminal of the multiplexer 28 at the fifth stage.

The fourth logic circuit group 34 includes an AND circuit D1 and an OR circuit D2. The AND circuit D1 outputs a logical product of the LINE_SELECT0 and the HSTR. The OR circuit D2 inputs a logical sum of the output of the AND circuit D1 and the output of the register circuit SR0 of the first signal outputting circuit 15 to the second input terminal of the multiplexer 28 at the third stage. Note that an output of the multiplexer 28 at the third stage is coupled to the register circuit SR3 of the first signal outputting circuit 15. An output of the register circuit SR3 of the first signal outputting circuit 15 is coupled to the first input terminal of the multiplexer 28 at the fourth stage and the second input terminal of the multiplexer 28 at the sixth stage.

Besides, an output of a register circuit SRi (note that "i" is an integer number, and 4≤"i"<"n−2") being the register circuit of SR4 or later is coupled to the first input terminal of the multiplexer 28 at the "i"-th stage and the second input terminal of the multiplexer 28 at the "i+2"-th stage. Note that outputs of register circuits SR(n−2) to (n−1) are each coupled only to the first input terminal of each multiplexer 28 at the subsequent stage. Besides, the register circuit SRn corresponding to the dummy pixel 19 becomes a termination of the shift register 27 (note that the register circuits SR(n−2) to n are not illustrated in the drawing).

Next, configurations of the fifth logic circuit group 35 to the eighth logic circuit group 38 are described. Note that the coupling relationship of the register circuits and the multiplexers 28 at the second signal outputting circuit 16 are the same as the first signal outputting circuit 15, and therefore, the redundant description is not given.

The fifth logic circuit group 35 includes an AND circuit E1, an AND circuit E2, and an OR circuit E3. The AND circuit E1 outputs a logical product of the LINE_SELECT0 and the HSTR. The AND circuit E2 outputs a logical product of a negative logic of the ADD_CNT and the HSTR. The OR circuit E3 inputs a logical sum of the output of the AND circuit E1 and the output of the AND circuit E2 to the register circuit SR0 of the second signal outputting circuit 16.

The sixth logic circuit group 36 includes an NAND circuit F1 and an AND circuit F2. The NAND circuit F1 outputs a negative logical product of the PIX2ADD and the LINE_SELECT0. The AND circuit F2 inputs a logical product of the output of the NAND circuit F1 and the HSTR to the second input terminal of the multiplexer 28 at the first stage.

The seventh logic circuit group 37 includes an NAND circuit G1 and an AND circuit G2. The NAND circuit G1 outputs a negative logical product of the PIX2ADD and the LINE_SELECT1. The AND circuit G2 inputs a logical product of the output of the NAND circuit G1 and the HSTR to the second input terminal of the multiplexer 28 at the second stage.

The eighth logic circuit group 38 includes an AND circuit H1 and an OR circuit H2. The AND circuit H1 outputs a logical product of the LINE_SELECT1 and the HSTR. The OR circuit H2 inputs a logical sum of the output of the AND circuit H1 and an output of the register circuit SR0 of the second signal outputting circuit 16 to the second input terminal of the multiplexer 28 at the third stage.

Hereinafter, an operation example of the solid stage imaging device in the one embodiment is described. FIG. 4 is a view illustrating a correspondence of the control signals and the read instruction signal in each operation mode.

The imaging device controlling circuit 18 in the non-addition read mode sets the ADD_CNT and the PIX2ADD at low-level. The imaging device controlling circuit 18 in the second addition read mode sets the ADD_CNT at high-level and the PIX2ADD at low-level. Besides, the imaging device controlling circuit 18 in the first addition read mode sets the ADD_CNT and the PIX2ADD at high-level.

Here, when the line to be read is the odd number row, the imaging device controlling circuit 18 sets the LINE_SELECT1 at high-level, and the LINE_SELECT0 at low-level. Accordingly, the column selector 21 of the first signal outputting circuit 15 selects the vertical signal line 14 at the odd number column, and the column selector 21 of the second signal outputting circuit 16 selects the vertical signal line 14 at the even number column. Accordingly, the signals of the Gb pixels are read from the first signal outputting circuit 15 and the signals of the B pixels are read from the second signal outputting circuit 16 when the line to be read is the odd number row.

On the other hand, when the line to be read is the even number row, the imaging device controlling circuit 18 sets the LINE_SELECT0 at high-level, and the LINE_SELECT1 at low-level. Accordingly, the column selector 21 of the first signal outputting circuit 15 selects the vertical signal line 14 at the even number column, and the column selector 21 of the second signal outputting circuit 16 selects the vertical signal line 14 at the odd number column. Accordingly, the signals of the Gr pixels are read from the first signal outputting circuit 15 and the signals of the R pixels are read from the second signal outputting circuit 16 when the line to be read is the even number row.

(In Case of Non-Addition Read Mode)

When all pixel reading is performed in the non-addition read mode, the vertical scanning circuit 13 sequentially specifies the line to be read one by one from below a top row.

Figure 5:
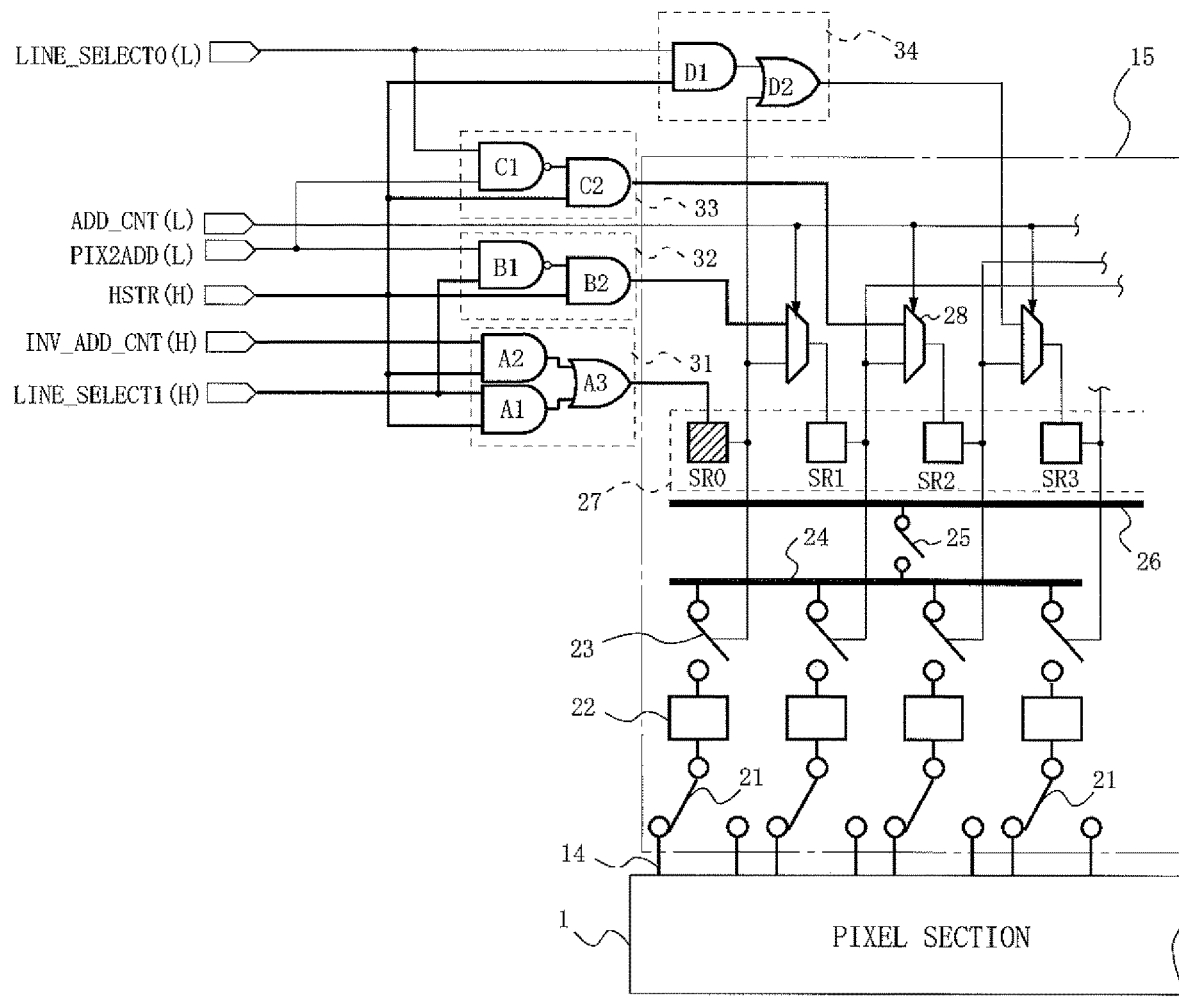
FIG. 5 is a view illustrating an operation example when a reading is performed in a non-addition read mode.

FIG. 5 is a view illustrating an operation example of the addition controlling circuit 17 and the first signal outputting circuit 15 when the reading is performed in the non-addition read mode. The example in FIG. 5 illustrates a case when the line to be read is the even number row. Note that in the description of the following operation example, a signal line in high-level is represented by a heavy line, and the register circuit to which the read instruction signal is input is represented by a hatching in the drawing.

In the non-addition read mode, the ADD_CNT is in low-level, and therefore, each of the multiplexers 28 of the first signal outputting circuit 15 outputs an output of the first input terminal to the register circuit at the subsequent stage. Accordingly, the signals from the second logic circuit group 32 to the fourth logic circuit group 34 are not input to the shift register 27 in the above-stated case.

At this time, the logical product of the negative logic of the ADD_CNT and the HSTR becomes "1" at the AND circuit A2 of the first logic circuit group 31. Accordingly, the output of the OR circuit A3 becomes "1", and the read instruction signal is input to the register circuit SR0. After that, the read instruction signal of the register circuit is sequentially input to the next register circuit via the first input terminal of the multiplexer 28. Each of the horizontal local switches 23 of the second signal outputting circuit 16 is thereby sequentially turned on one by one from left to right in the drawing, and the image signals on the line to be read are read.

When the reading is performed in the non-addition read mode, the shift register 27 of the first signal outputting circuit 15 operates approximately the same as the above also in case when the line to be read is the odd number row. Besides, the shift register 27 of a second signal outputting circuit 16 also operates approximately the same as the shift register 27 of the first signal outputting circuit 15.

According to the above-stated operation, the signals of the Gb pixels are sequentially read from the first signal outputting circuit 15 and the signals of the B pixels are sequentially read from the second signal outputting circuit 16 when the line to be read is the odd number row. Besides, the signals of the Gr pixels are sequentially read from the first signal outputting circuit 15 and the signals of the R pixels are sequentially read from the second signal outputting circuit 16 when the line to be read is the even number row. The solid state imaging device is thereby able to perform the all pixel reading.

(In Case of First Addition Read Mode)

Next, an operation example of the solid state imaging device in the first addition read mode is described.

Figure 6:
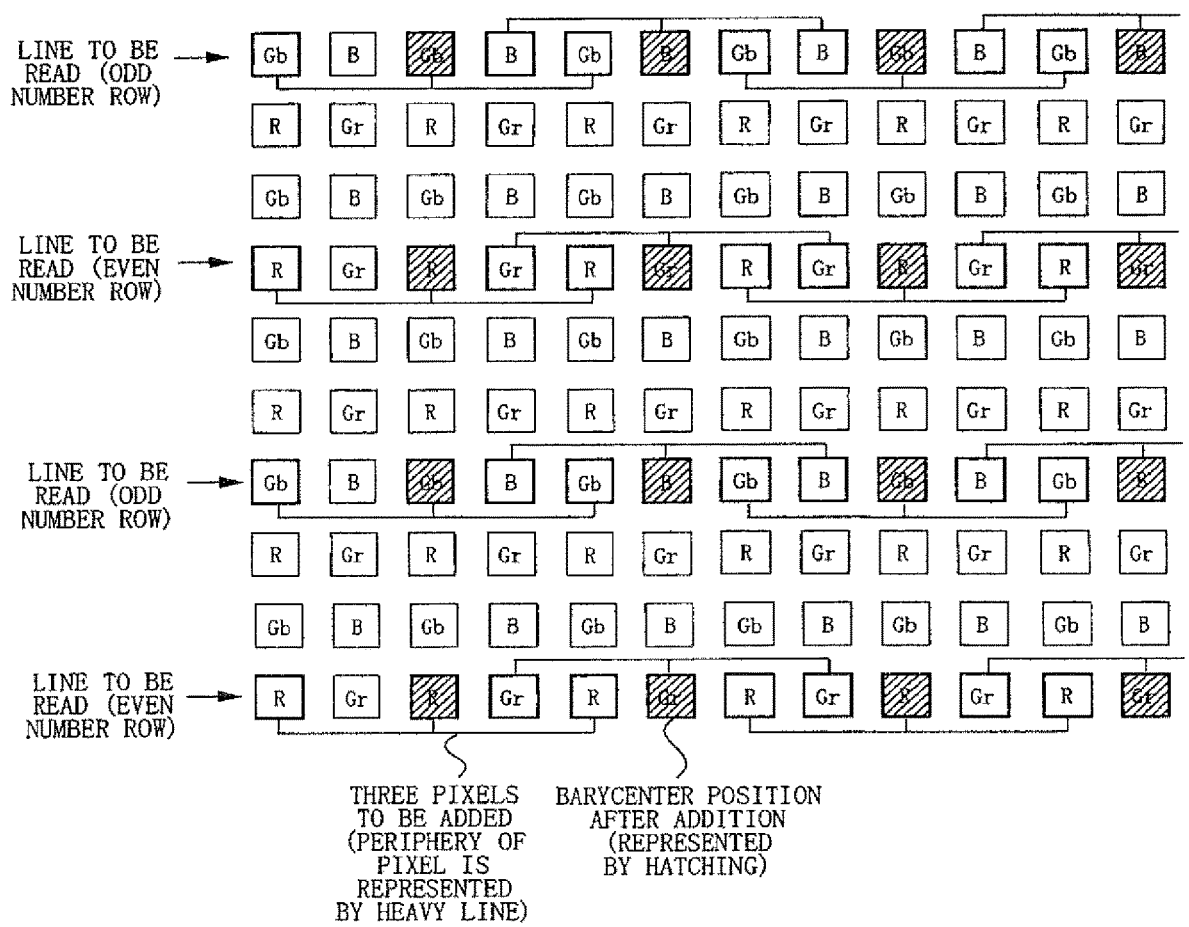
FIG. 6 is a view illustrating sampling positions of pixels read in a first addition read mode.

FIG. 6 is a view illustrating sampling positions of pixels read in the first addition read mode. The vertical scanning circuit 13 in the first addition read mode specifies the line to be read by every two rows. Besides, the first signal outputting circuit 15 and the second signal outputting circuit 16 perform the addition read of adjacent signals for three pixels in the same color at the line to be read. Namely, the solid state imaging device in the first addition read mode outputs an image of which number of vertical and horizontal pixels is one-third compared to the case of the all pixel reading. Here, in the first addition read mode, it is necessary to determine the sampling positions of the signals to be added such that a barycenter position of each color pixel after the addition maintains the Barer array.

For example, a case when the line to be read is the odd number row in the first addition read mode is considered. In FIG. 6, the signal of the first Gb pixel is generated by adding the signals at the first, the third, and the fifth column. The barycenter position of the Gb pixel after the addition becomes at the third column. Accordingly, it is necessary for the addition controlling circuit 17 to simultaneously input the read instruction signals to the register circuits SR0 to 2 of the first signal outputting circuit 15 to perform the addition read of the signals of the Gb pixels at the first, the third and the fifth column. On the other hand, in FIG. 6, the signal of the first B pixel is generated by adding the signals at the fourth, the sixth, and the eighth column. The barycenter position of the B pixel after the addition becomes at the sixth column. Accordingly, it is necessary for the addition controlling circuit 17 to simultaneously input the read instruction signals to the register circuits SR1 to 3 of the second signal outputting circuit 16 to perform the addition read of the signals of the B pixels at the fourth, the sixth and the eighth column.

Figure 7:
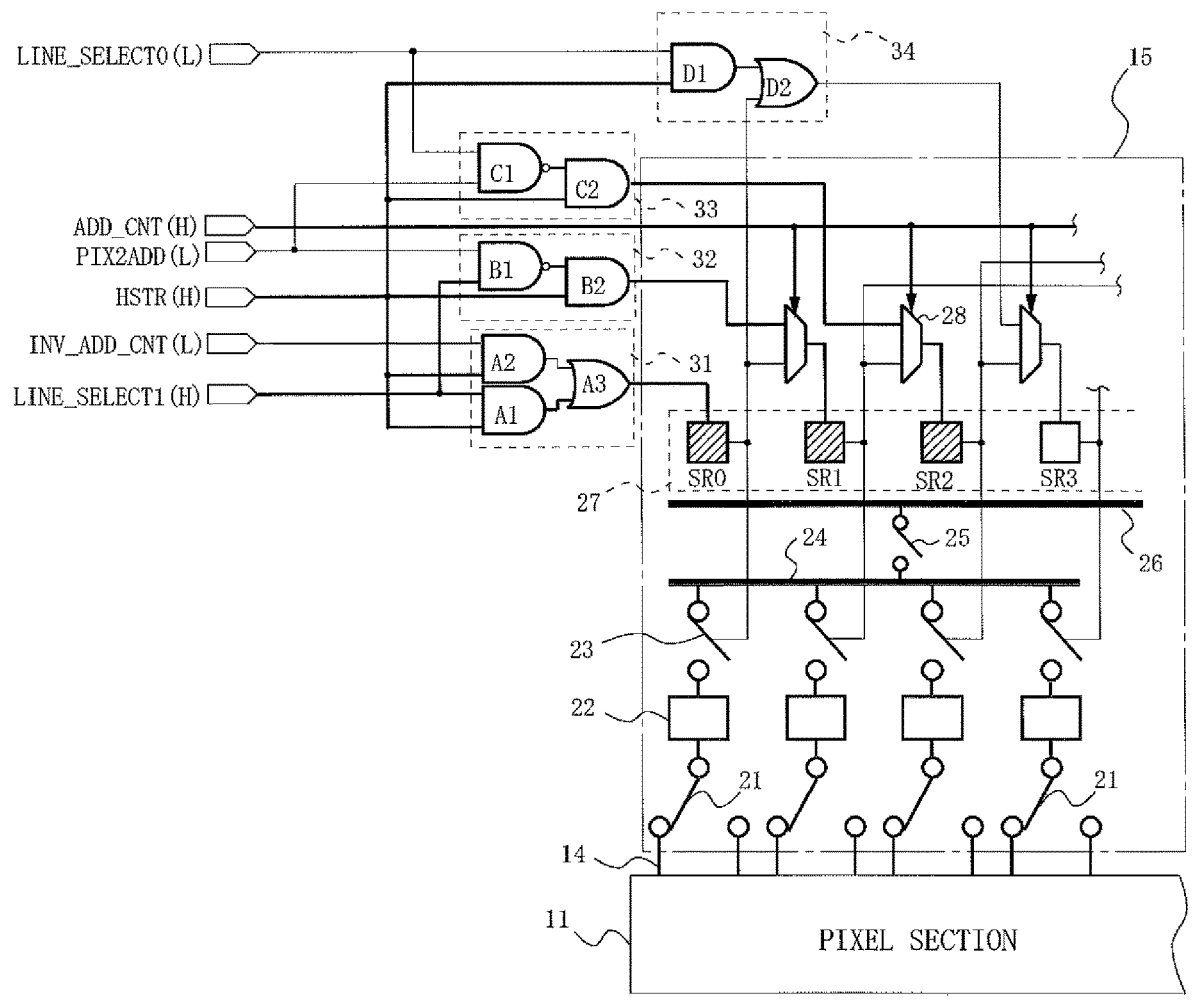
FIG. 7 is a view illustrating an operation example at the first signal outputting circuit side when odd number rows are read in the first addition read mode.

FIG. 7 is a view illustrating an operation example at the first signal outputting circuit 15 side when the odd number row is read in the first addition read mode. Note that the ADD_CNT is in high-level in the first addition read mode. Accordingly, each of the multiplexers 28 at the first signal outputting circuit 15 and the second signal outputting circuit 16 outputs an output of the second input terminal to the register circuit at the subsequent stage.

At the AND circuit A1 of the first logic circuit group 31, the logical product of the LINE_SELECT1 and the HSTR becomes "1". Accordingly, the output of the OR circuit A3 becomes "1", and the read instruction signal is input to the register circuit SR0.

Besides, at the NAND circuit B1 of the second logic circuit group 32, the negative logical product of the PIX2ADD and the LINE_SELECT1 becomes "1". Besides, at the AND circuit B2, the logical product becomes "1" when the HSTR is input. Accordingly, the output of the AND circuit B2 becomes "1", and the read instruction signal is input to the register circuit SR1 via the multiplexer 28 at the first stage.

Besides, at the NAND circuit C1 of the third logic circuit group 33, the negative logical product of the PIX2ADD and the LINE_SELECT0 becomes "1". At the AND circuit C2, the logical product becomes "1" when the HSTR is input. Accordingly, the output of the AND circuit C2 becomes "1", and the read instruction signal is input to the register circuit SR2 via the multiplexer 28 at the second stage.

Besides, at the AND circuit D1 of the fourth logic circuit group 34, the logical product of the LINE_SELECT0 and the HSTR constantly becomes "0" (zero). Accordingly, at the OR circuit D2, the output becomes "1" when the input from the register circuit SR0 is "1".

The three read instruction signals are thereby simultaneously input to the register circuits SR0 to 2. The three horizontal local switches 23 corresponding to the register circuits SR0 to 2 are simultaneously turned on, and the signals of the Gb pixels at the first, the third, and the fifth column are addition read. After that, the register circuits of the shift register 27 are sequentially turned on three by three from left to right in the drawing, and the signals of the Gr pixels at the line to be read are addition read three by three.

Figure 8:
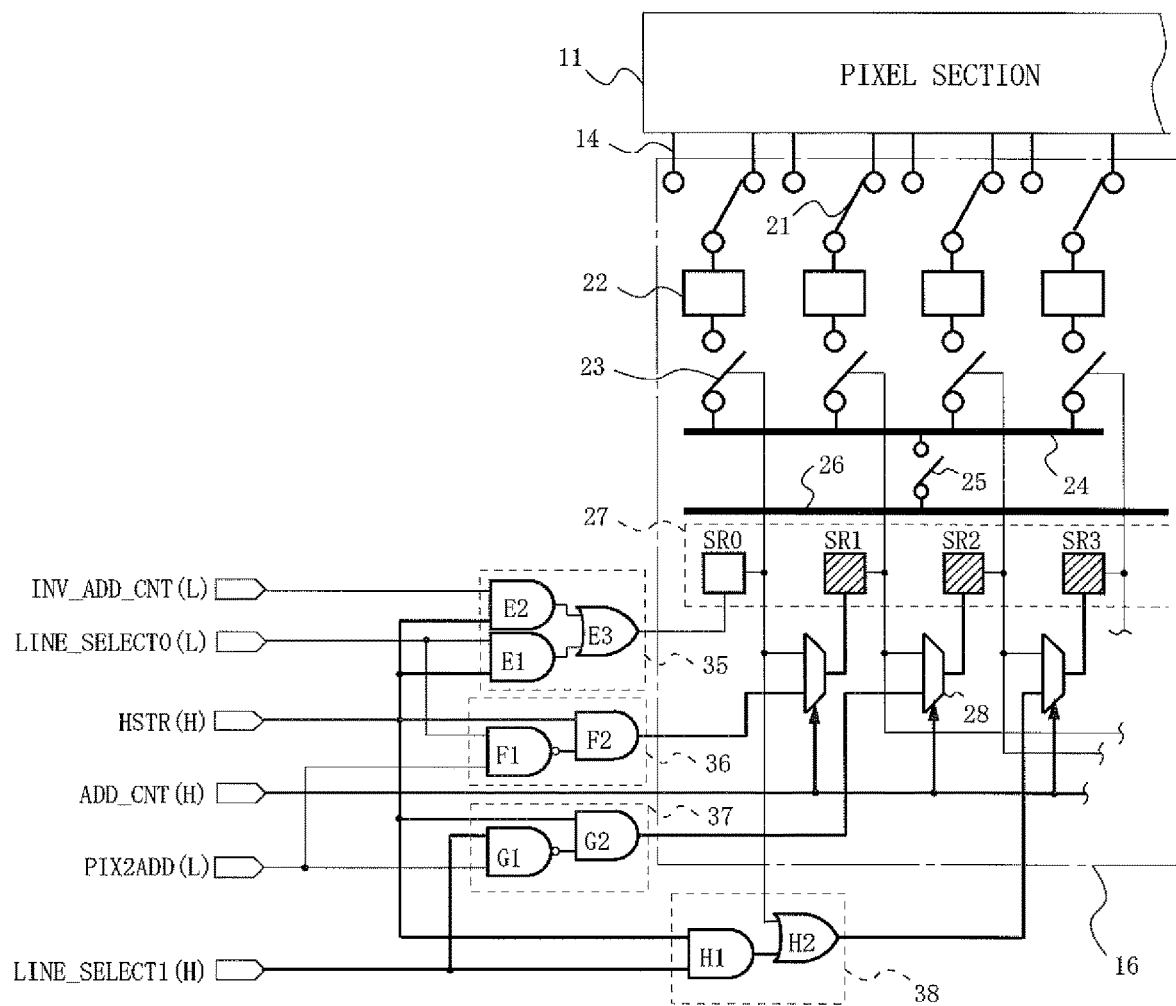
FIG. 8 is a view illustrating an operation example at the second signal outputting circuit side when the odd number row is read in the first addition read mode.

FIG. 8 is a view illustrating an operation example at the second signal outputting circuit 16 side when the odd number row is read in the first addition read mode.

At this time, each of the LINE_SELECT0 and the negative logics of the ADD_CNT becomes "0" (zero). Accordingly, the logical product of the AND circuit E1 and the AND circuit E2 constantly becomes "0" (zero) even when the HSTR is input. The output of the OR circuit E3 of the fifth logic circuit group 35 thereby becomes "0" (zero), and therefore, the read instruction signal is not input to the register circuit SR0 of the second signal outputting circuit 16.

Besides, at the NAND circuit F1 of the sixth logic circuit group 36, the negative logical product of the PIX2ADD and the LINE_SELECT0 becomes "1". At the AND circuit F2, the logical product becomes "1" when the HSTR is input. Accordingly, the output of the AND circuit F2 becomes "1", and the read instruction signal is input to the register circuit SR1 via the multiplexer 28 at the first stage.

Besides, at the NAND circuit G1 of the seventh logic circuit group 37, the negative logical product of the PIX2ADD and the LINE_SELECT1 becomes "1". At the AND circuit G2, the logical product becomes "1" when the HSTR is input. Accordingly, the output of the AND circuit G2 becomes "1", and the read instruction signal is input to the register circuit SR2 via the multiplexer 28 at the second stage.

Besides, at the AND circuit H1 of the eighth logic circuit group 38, the logical product of the LINE_SELECT1 and the HSTR becomes "1". Accordingly, the output of the OR circuit H2 becomes "1", and the read instruction signal is input to the register circuit SR3 via the multiplexer 28 at the third stage.

The three read instruction signals are thereby simultaneously input to the register circuits SR1 to 3. The three horizontal local switches 23 corresponding to the register circuits SR1 to 3 are simultaneously turned on, and the signals of the B pixels at the fourth, the sixth, and the eighth column are addition read. After that, the register circuits of the shift register 27 are sequentially turned on three by three from left to right in the drawing, and the signals of the B pixels in the line to be read are addition read three by three.

Similarly, a case when the line to be read is the even number row in the first addition read mode is considered. In FIG. 6, the signal of the first Gr pixel is generated by adding the signals at the fourth, the sixth, and the eighth column. The barycenter position of the Gr pixel after the addition becomes at the sixth column. Accordingly, it is necessary for the addition controlling circuit 17 to simultaneously input the read instruction signals to the register circuits SR1 to 3 of the first signal outputting circuit 15 to addition read the signals of the Gr pixels at the fourth, the sixth, and the eighth column. On the other hand, in FIG. 6, the signal of the first R pixel is generated by adding the signals at the first, the third, and the fifth column. The barycenter position of the R pixel after the addition becomes at the third column. Accordingly, it is necessary for the addition controlling circuit 17 to simultaneously input the read instruction signals to the register circuits SR0 to 2 of the second signal outputting circuit 16 to addition read the signals of the R pixels at the first, the third, and the fifth column.

Figure 9:
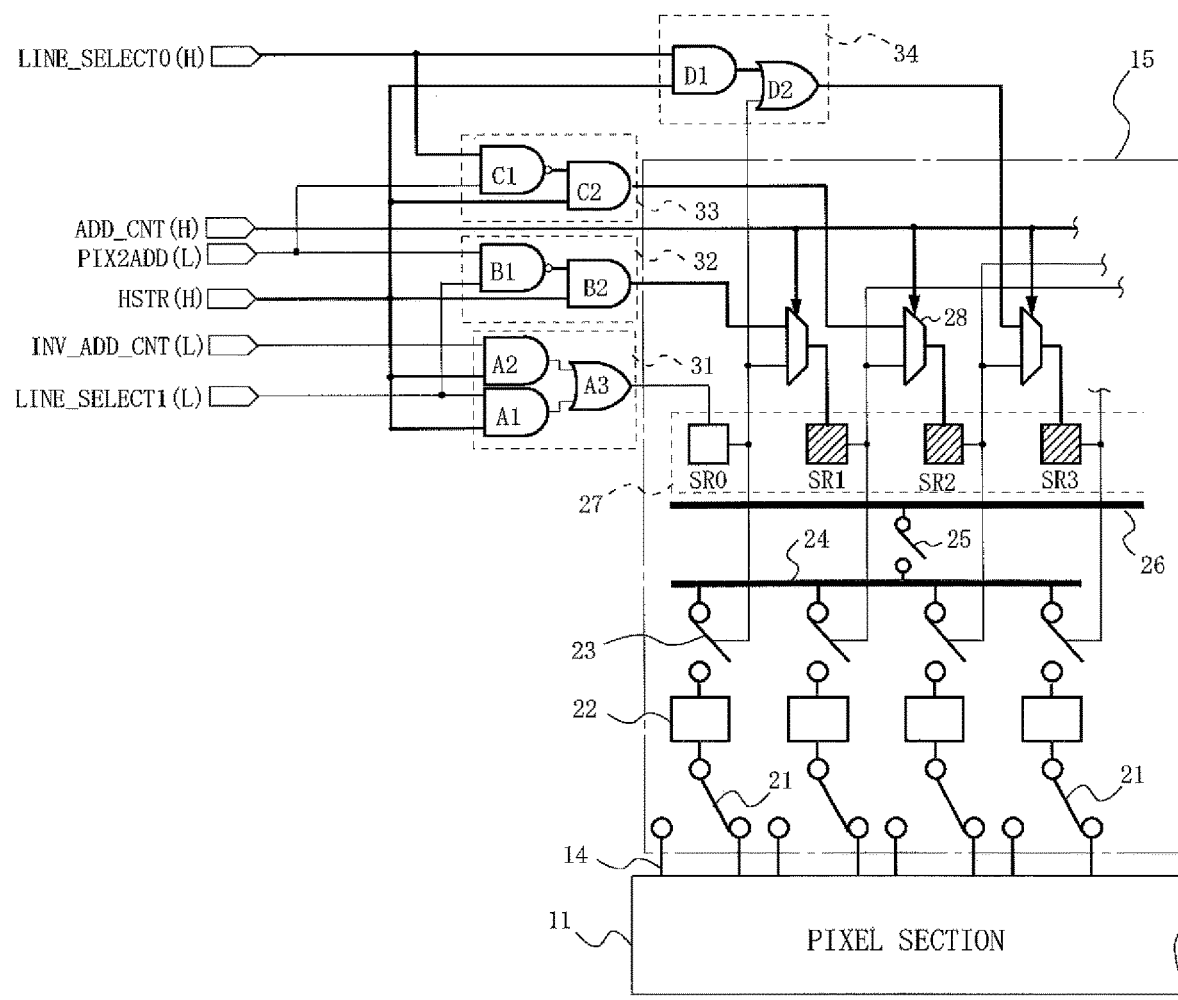
FIG. 9 is a view illustrating an operation example at the first signal outputting circuit side when even number rows are read in the first addition read mode.

FIG. 9 is a view illustrating an operation example at the first signal outputting circuit 15 side when the even number row is read in the first addition read mode.

At this time, each of the LINE_SELECT1 and the negative logics of the ADD_CNT becomes "0" (zero). Accordingly, the logical product of the AND circuit A1 and the AND circuit A2 constantly becomes "0" (zero) even when the HSTR is input. The output of the OR circuit A3 thereby becomes "0" (zero), and therefore, the read instruction signal is not input to the register circuit SR0 of the first signal outputting circuit 15.

Besides, at the NAND circuit B1 of the second logic circuit group 32, the negative logical product of the PIX2ADD and the LINE_SELECT1 becomes "1". At the AND circuit B2, the logical product becomes "1" when the HSTR is input. Accordingly, the output of the AND circuit B2 becomes "1", and the read instruction signal is input to the register circuit SR1 via the multiplexer 28 at the first stage.

Besides, at the NAND circuit C1 of the third logic circuit group 33, the negative logical product of the PIX2ADD and the LINE_SELECT0 becomes "1". Besides, at the AND circuit C2, the logical product becomes "1" when the HSTR is input. Accordingly, the output of the AND circuit C2 becomes "1", and the read instruction signal is input to the register circuit SR2 via the multiplexer 28 at the second stage.

Besides, at the AND circuit D1 of the fourth logic circuit group 34, the logical product of the LINE_SELECT0 and the HSTR becomes "1". Accordingly, the output of the OR circuit H2 becomes "1", and the read instruction signal is input to the register circuit SR3 via the multiplexer 28 at the third stage.

The three read instruction signals are thereby simultaneously input to the register circuits SR1 to 3. The three horizontal local switches 23 corresponding to the register circuits SR1 to 3 are simultaneously turned on, and the signals of the Gr pixels at the fourth, the sixth, and the eighth column are addition read. After that, the register circuits of the shift register 27 are sequentially turned on three by three from left to right in the drawing, and the signals of the Gr pixels in the line to be read are addition read three by three.

Figure 10:
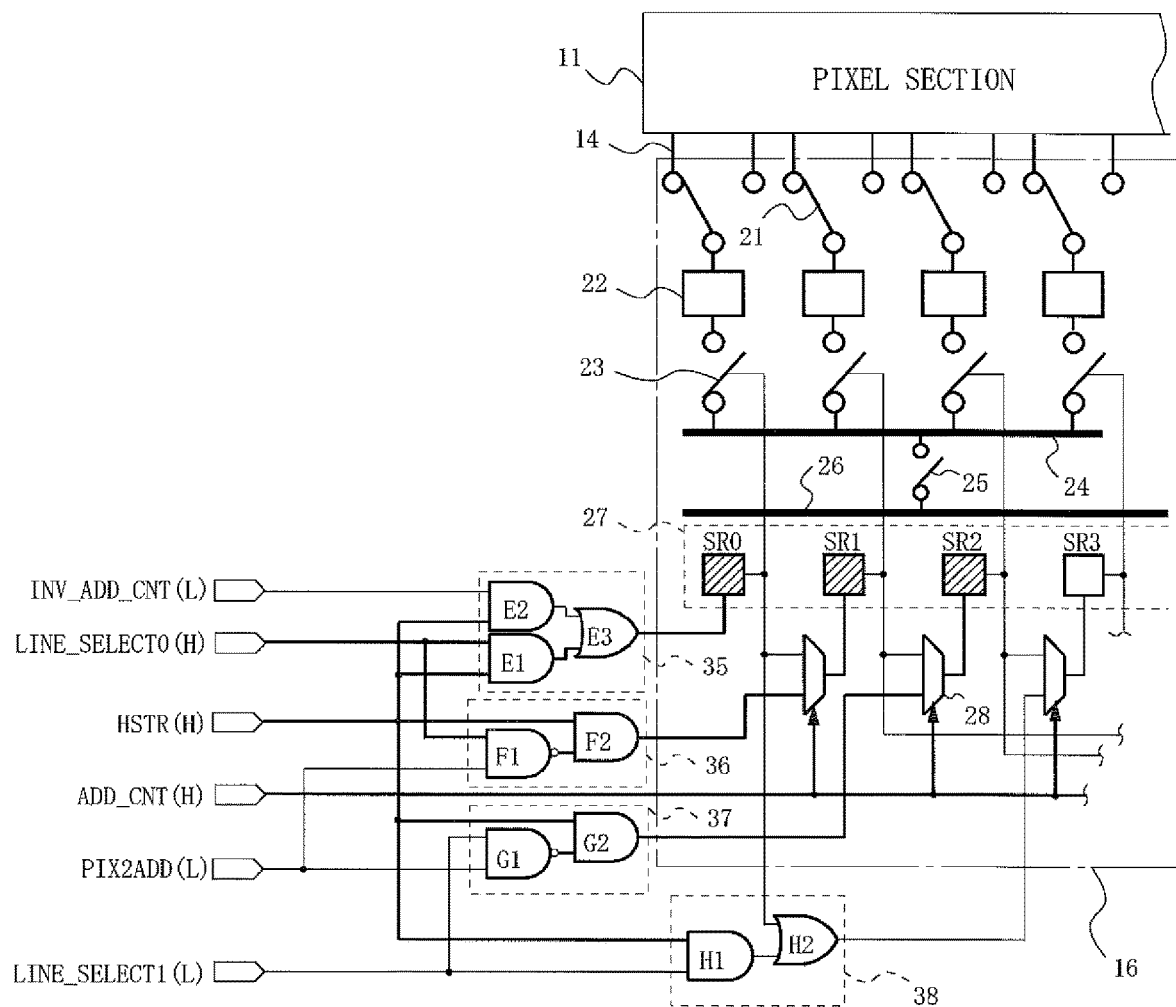
FIG. 10 is a view illustrating an operation example at the second signal outputting circuit side when the even number row is read in the first addition read mode.

FIG. 10 is a view illustrating an operation example at the second signal outputting circuit 16 side when the even number row is read in the first addition read mode.

At the AND circuit E1 of the fifth logic circuit group 35, the logical product of the LINE_SELECT0 and the HSTR becomes "1". Accordingly, the output of the OR circuit E3 becomes "1", and the read instruction signal is input to the register circuit SR0.

Besides, at the NAND circuit F1 of the sixth logic circuit group 36, the negative logical product of the PIX2ADD and the LINE_SELECT0 becomes "1". At the AND circuit F2, the logical product becomes "1" when the HSTR is input. Accordingly, the output of the AND circuit F2 becomes "1", and the read instruction signal is input to the register circuit SR1 via the multiplexer 28 at the first stage.

Besides, at the NAND circuit G1 of the seventh logic circuit group 37, the negative logical product of the PIX2ADD and the LINE_SELECT1 becomes "1". At the AND circuit G2, the logical product becomes "1" when the HSTR is input. Accordingly, the output of the AND circuit G2 becomes "1", and the read instruction signal is input to the register circuit SR2 via the multiplexer 28 at the second stage.

Besides, at the AND circuit H1 of the eighth logic circuit group 38, the logical product of the LINE_SELECT1 and the HSTR constantly becomes "0" (zero). Accordingly, at the OR circuit H2, the output becomes "1" when the input from the register circuit SR0 is "1".

The three read instruction signals are thereby simultaneously input to the register circuits SR0 to 2. The three horizontal local switches 23 corresponding to the register circuits SR0 to 2 are simultaneously turned on, and the signals of the R pixels at the first, the third, and the fifth column are addition read. After that, the register circuits of the shift register 27 are sequentially turned on three by three from left to right in the drawing, and the signals of the R pixels in the line to be read are addition read three by three.

Here, in the addition read mode, a displacement occurs in the sampling positions of the pixels between the first signal outputting circuit 15 and the second signal outputting circuit 16 in a Bayer array unit. However, in the solid state imaging device according to the one embodiment, a lacking pixel at the addition read time is compensated by the dummy pixel 19 provided at one end side of the line to be read. Accordingly, it is possible to align the number of pixels of the line to be read between the first signal outputting circuit 15 and the second signal outputting circuit 16 in the addition read mode. Note that it is general that an outer edge portion of the pixel section 11 is used as an optical black pixel, and therefore, it is conceivable that there is almost no effect on the image if the dummy pixel 19 is used.

As stated above, the addition controlling circuit 17 in the first addition read mode shifts a reading start position by the shift register 27 between the first signal outputting circuit 15 and the second signal outputting circuit 16. The sampling positions of the pixels to be added shift between the first signal outputting circuit 15 and the second signal outputting circuit 16 in the Bayer array unit.

It is therefore possible for the solid state imaging device in the first addition read mode to simultaneously read the signals by each color from the first signal outputting circuit 15 and the second signal outputting circuit 16 without displacement of the barycenter positions of the respective color pixels after the addition. Besides, it is possible for the solid state imaging device in the first addition read mode to improve an SN ratio of each image signal compared to a case when an image in the same size is read by a thinning-out reading.

Besides, it is possible for the solid state imaging device in the first addition read mode to drastically speed up the reading of the image compared to a case when the addition of the image signals is performed after the all pixel reading is performed. In particular, it is easy for the solid state imaging device in the first addition read mode to shorten a frame rate when a moving image is captured.

(In Case of Second Addition Read Mode)

Next, an operation example of the solid state imaging device in the second addition read mode is described. Note that all of the redundant description with the above-stated first addition read mode is not given in the second addition read mode.

Figure 11:
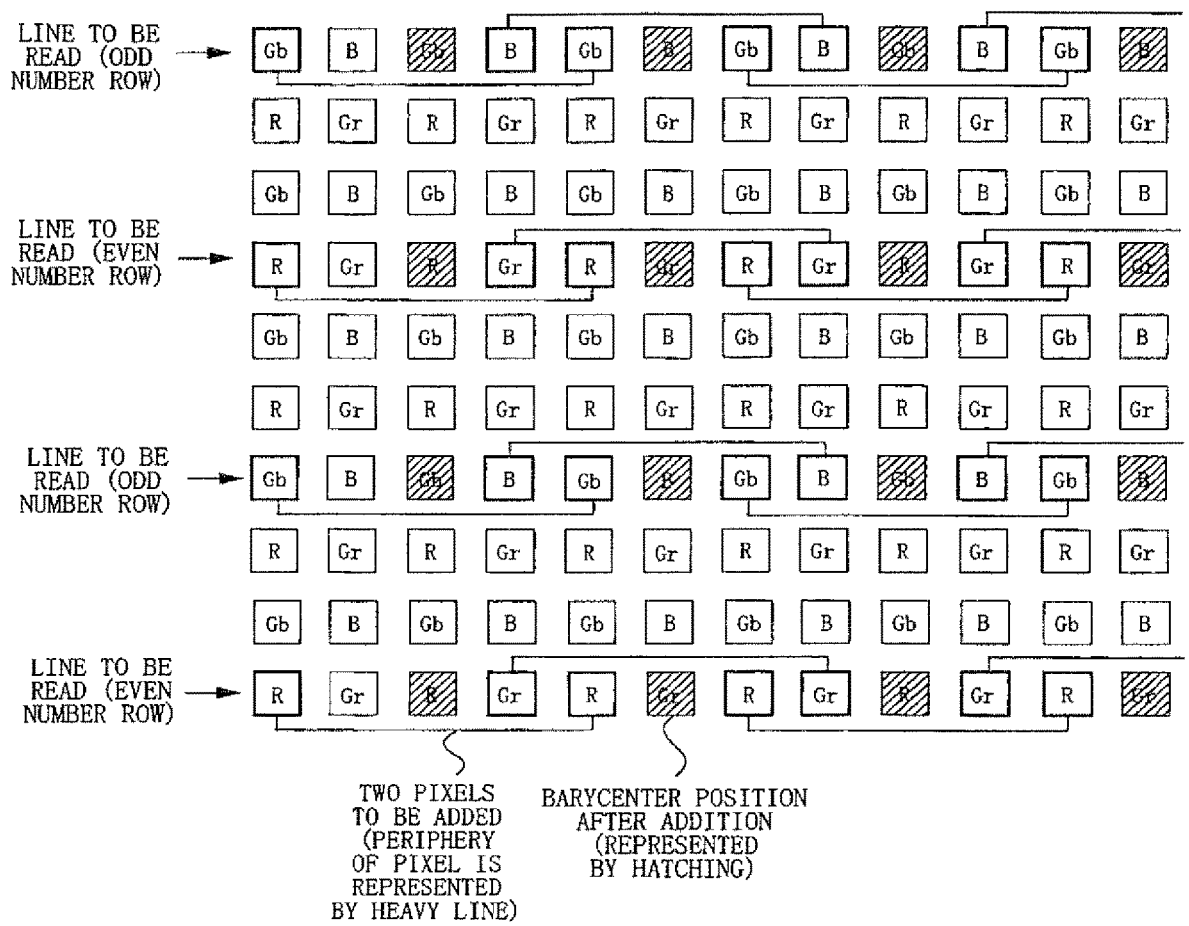
FIG. 11 is a view illustrating sampling positions of pixels read in a second addition read mode.

FIG. 11 is a view illustrating sampling positions of pixels read in the second addition read mode. The reading in the second addition read mode is different from the reading in the first addition read mode in the following points. As illustrated in FIG. 11, signals for two pixels are addition read in the second addition read mode except a center pixel from among signals for adjacent three pixels in the same color in the line to be read.

For example, a case when the line to be read is the odd number row in the second addition read mode is considered. In FIG. 11, a signal of a first Gb pixel is generated by adding signals at a first and a fifth column. A barycenter position of the Gb pixel after the addition is at a third column. Accordingly, it is necessary for the addition controlling circuit 17 to simultaneously input the read instruction signals to the register circuits SR0, SR2 of the first signal outputting circuit 15 to perform the addition read of the signals of the Gb pixels at the first and the fifth column. On the other hand, in FIG. 11, a signal of a first B pixel is generated by adding signals at a fourth and an eighth column. A barycenter position of the B pixel after the addition is at a sixth column. Accordingly, it is necessary for the addition controlling circuit 17 to simultaneously input the read instruction signals to the register circuits SR1, SR3 of the second signal outputting circuit 16 to perform the addition read of the signals of the B pixels at the fourth and the eighth column.

Figure 12:
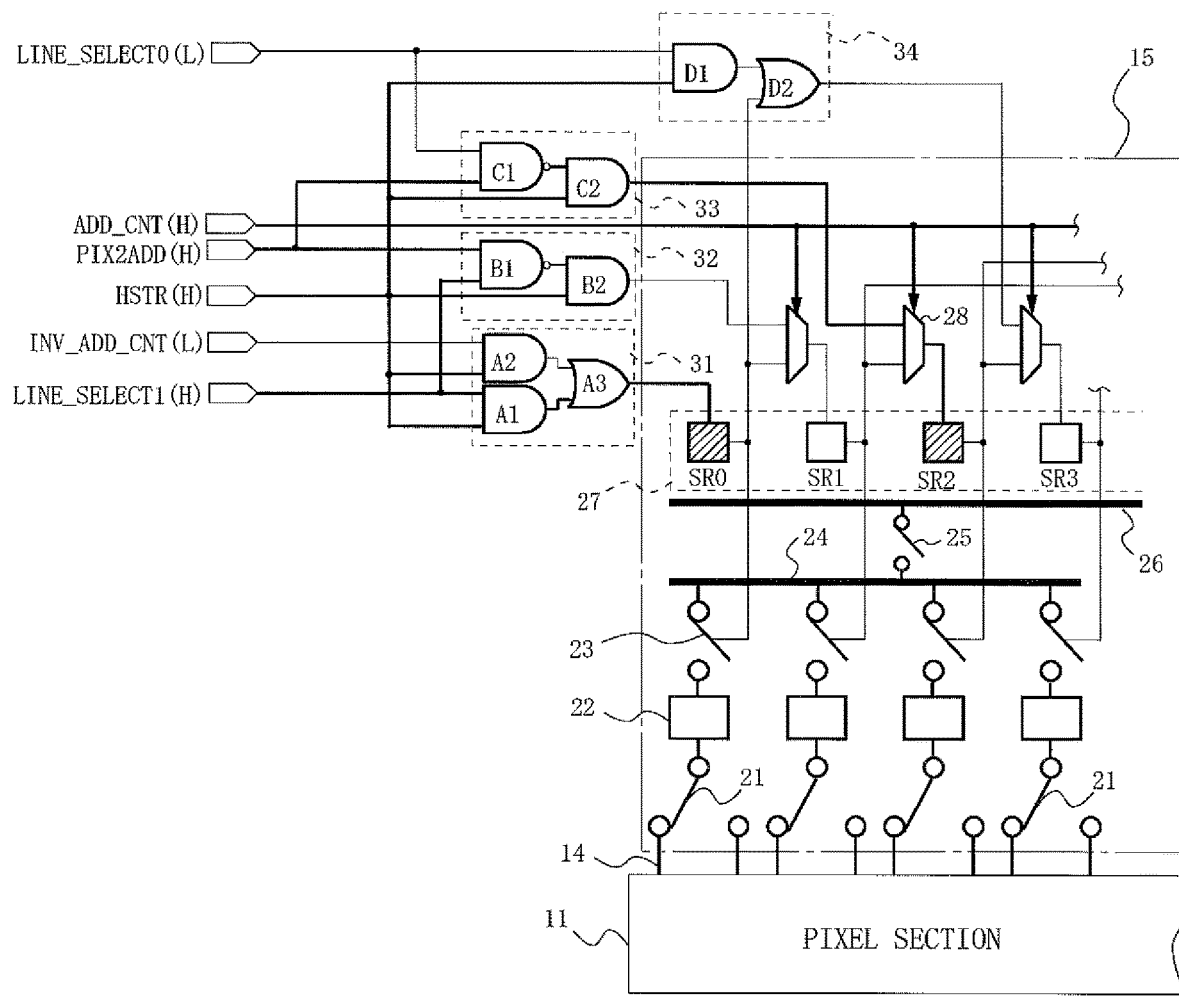
FIG. 12 is a view illustrating an operation example at the first signal outputting circuit side when the odd number row is read in the second addition read mode.

FIG. 12 is a view illustrating an operation example at the first signal outputting circuit 15 side when the odd number row is read in the second addition read mode. In case of FIG. 12, the operation of the second logic circuit group 32 is different from the case in FIG. 7 because the PIX2ADD becomes "1".

At the NAND circuit B1 of the second logic circuit group 32, the negative logical product of the PIX2ADD and the LINE_SELECT1 becomes "0" (zero). The logical product becomes constantly "0" (zero) at the AND circuit B2. Accordingly, the output of the AND circuit B2 becomes "0" (zero), and the read instruction signal is not input to the register circuit SR1 of the first signal outputting circuit 15.

The two read instruction signals are thereby simultaneously input to the register circuits SR0, SR2. The two horizontal local switches 23 corresponding to the register circuits SR0, SR2 are simultaneously turned on, and the signals of the Gb pixels at the first and the fifth column are addition read. After that, the read instruction signal of the shift register 27 is sequentially input to the register circuit at two register circuits ahead.

Figure 13:
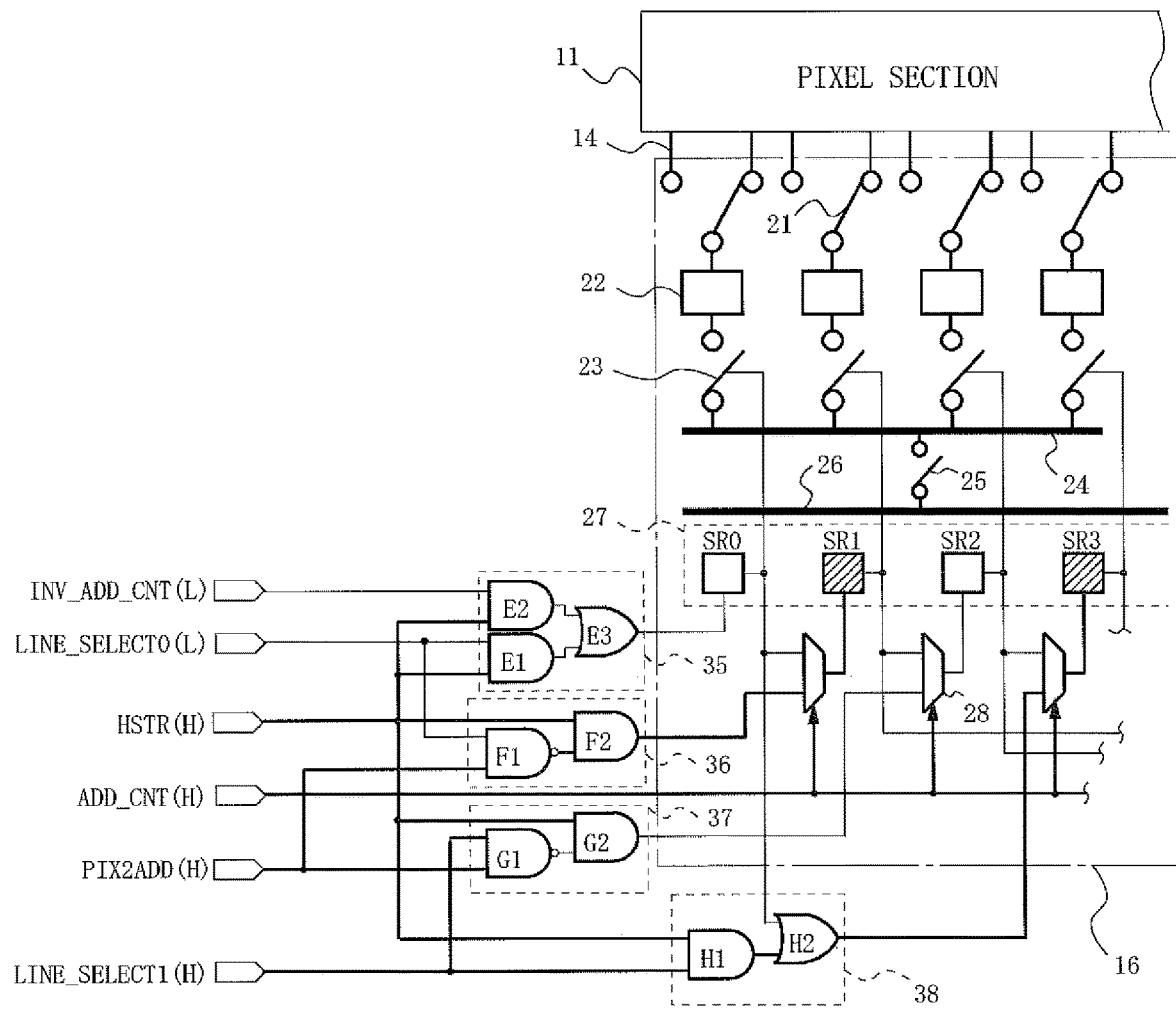
FIG. 13 is a view illustrating an operation example at the second signal outputting circuit side when the odd number row is read in the second addition read mode.

FIG. 13 is a view illustrating an operation example at the second signal outputting circuit 16 side when the odd number row is read in the second addition read mode. In case of FIG. 13, the operation of the seventh logic circuit group 37 is different from the case in FIG. 8 because the PIX2ADD becomes "1".

At the NAND circuit G1 of the seventh logic circuit group 37, the negative logical product of the PIX2ADD and the LINE_SELECT1 becomes "0" (zero). The logical product becomes constantly "0" (zero) at the AND circuit G2. Accordingly, the output of the AND circuit G2 becomes "0" (zero), and the read instruction signal is not input to the register circuit SR2 of the second signal outputting circuit 16.

The two read instruction signals are thereby simultaneously input to the register circuits SR1, SR3. The two horizontal local switches 23 corresponding to the register circuits SR1, SR3 are simultaneously turned on, and the signals of the B pixels at the fourth and the eighth column are addition read. After that, the read instruction signal of the shift register 27 is sequentially input to the register circuit at two register circuits ahead.

Similarly, a case when the line to be read mode is the even number row in the second addition read is considered. In FIG. 11, a signal of a first Gr pixel is generated by adding signals at a fourth and an eighth column. A barycenter position of the Gr pixel after the addition is at a sixth column. Accordingly, it is necessary for the addition controlling circuit 17 to simultaneously input the read instruction signals to the register circuits SR1, SR3 of the first signal outputting circuit 15 to perform the addition read of the signals of the Gr pixels at the fourth and the eighth column. On the other hand, in FIG. 11, a signal of a first R pixel is generated by adding signals at a first and a fifth column. A barycenter position of the R pixel after the addition is at a third column. Accordingly, it is necessary for the addition controlling circuit 17 to simultaneously input the read instruction signals to the register circuits SR0, SR2 of the second signal outputting circuit 16 to perform the addition read of the signals of the R pixels at the first and the fifth column.

Figure 14:
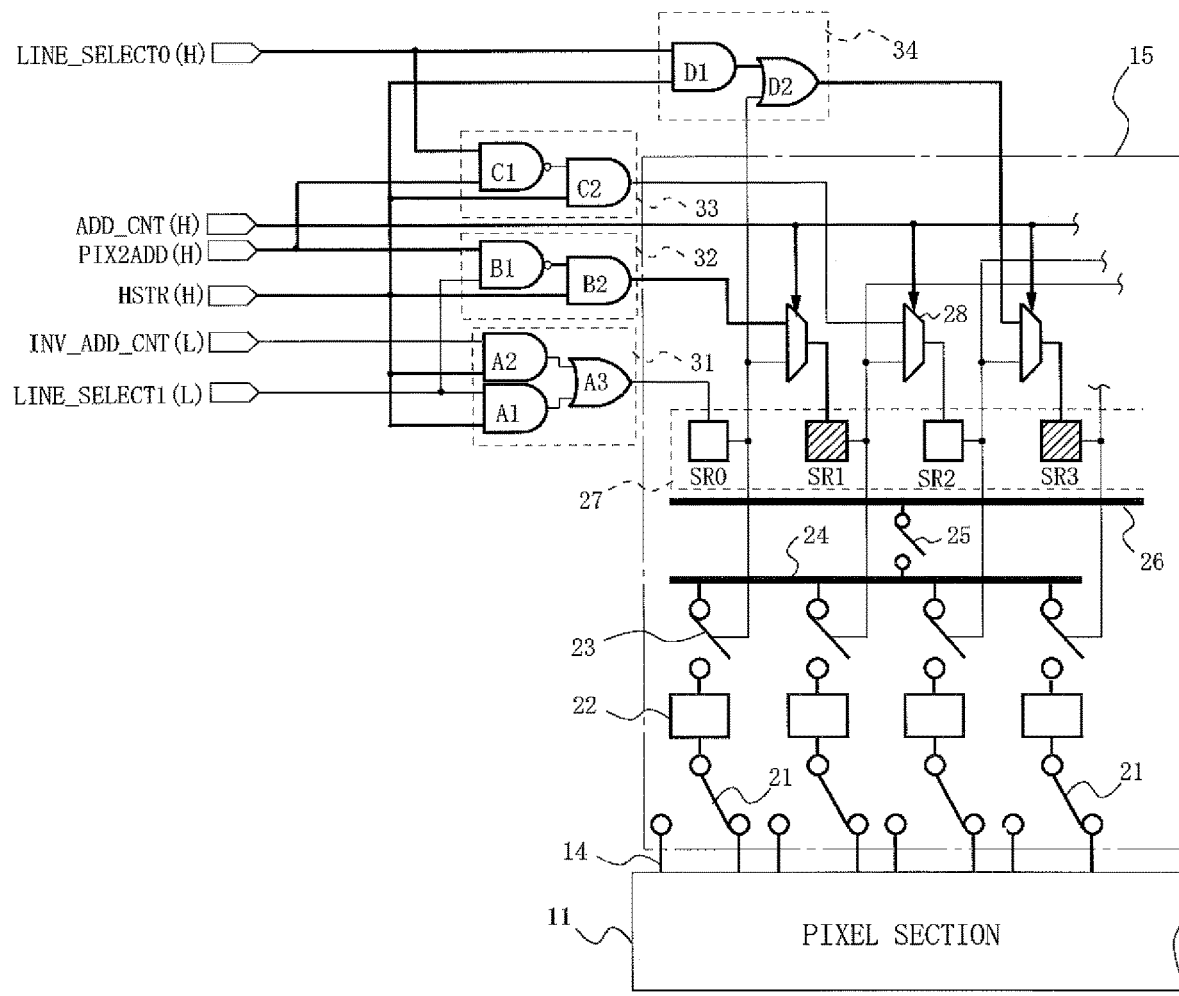
FIG. 14 is a view illustrating an operation example at the first signal outputting circuit side when the even number row is read in the second addition read mode.

FIG. 14 is a view illustrating an operation example at the first signal outputting circuit 15 side when the even number row is read in the second addition read mode. In case of FIG. 14, the operation of the third logic circuit group 33 is different from the case in FIG. 9 because the PIX2ADD becomes "1".

At the NAND circuit C1 of the third logic circuit group 33, the negative logical product of the PIX2ADD and the LINE_SELECT0 becomes "0" (zero). The logical product becomes constantly "0" (zero) at the AND circuit C2. Accordingly, the output of the AND circuit C2 becomes "0" (zero), and the read instruction signal is not input to the register circuit SR2 of the first signal outputting circuit 15.

The two read instruction signals are thereby simultaneously input to the register circuits SR1, SR3. The two horizontal local switches 23 corresponding to the register circuits SR1, SR3 are simultaneously turned on, and the signals of the Gr pixels at the fourth and the eighth column are addition read. After that, the read instruction signal of the shift register 27 is sequentially input to the register circuit at two register circuits ahead.

Figure 15:
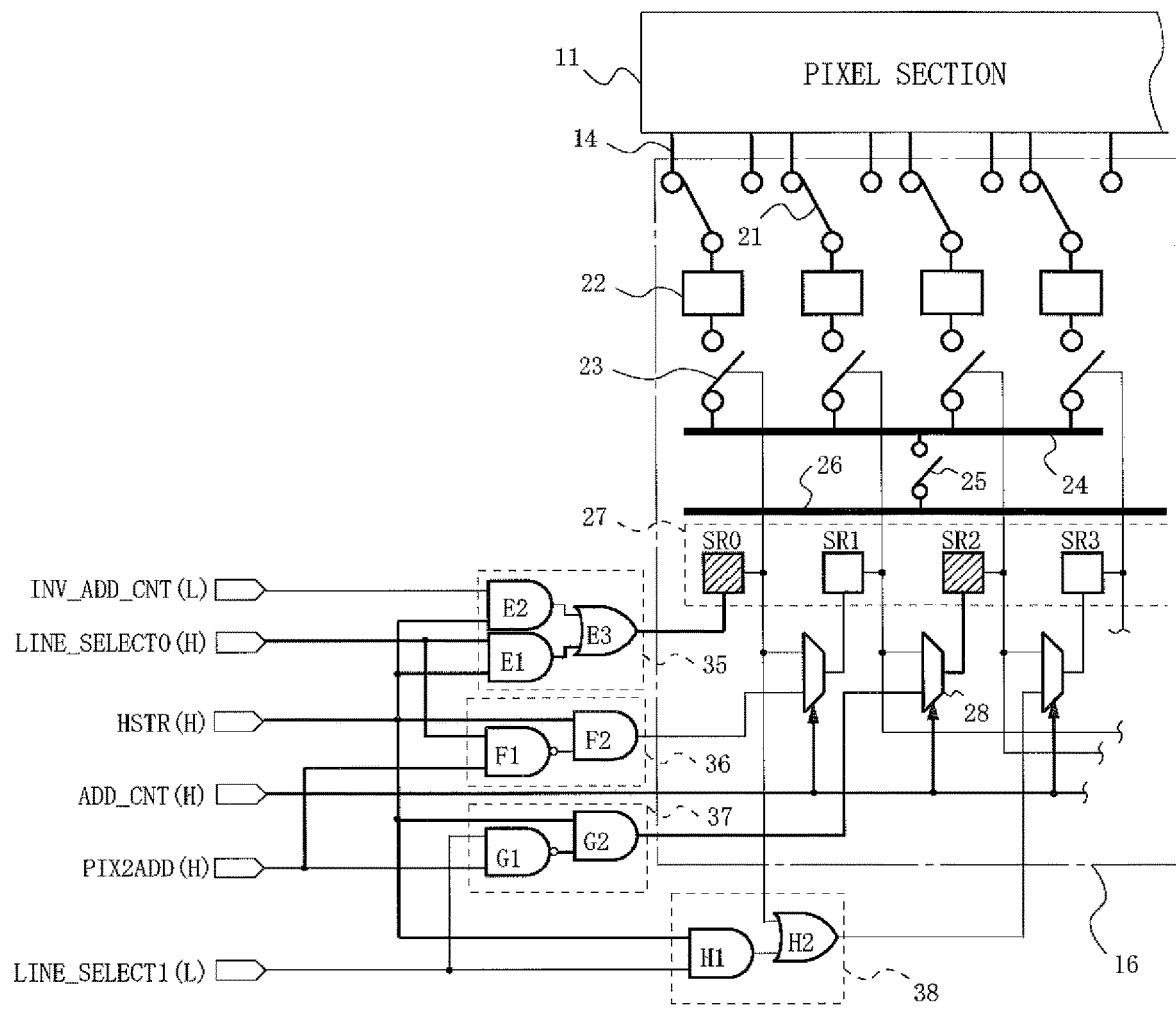
FIG. 15 is a view illustrating an operation example at the second signal outputting circuit side when the even number row is read in the second addition read mode.

FIG. 15 is a view illustrating an operation example at the second signal outputting circuit 16 side when the even number row is read in the second addition read mode. In case of FIG. 15, the operation of the sixth logic circuit group 36 is different from the case in FIG. 10 because the PIX2ADD becomes "1".

At the NAND circuit F1 of the sixth logic circuit group 36, the negative logical product of the PIX2ADD and the LINE_SELECT0 becomes "0" (zero). The logical product constantly becomes "0" (zero) at the AND circuit F2. Accordingly, the output of the AND circuit F2 becomes "0" (zero), and the read instruction signal is not input to the register circuit SR1 of the second signal outputting circuit 16.

The two read instruction signals are thereby simultaneously input to the register circuits SR0, SR2. The two horizontal local switches 23 corresponding to the register circuits SR0, SR2 are simultaneously turned on, and the signals of the R pixels at the first and the fifth column are addition read. After that, the read instruction signal of the shift register 27 is sequentially input to the register circuit at two register circuits ahead.

As stated above, the solid state imaging device in the second addition read mode is able to obtain the similar effect as the above-stated effect of the first addition read mode.

Note that the solid state imaging device according to the one embodiment is able to capture a further proper image by selecting the first addition read mode and the second addition read mode in accordance with a scene to be photographed. For example, it is possible for the solid state imaging device to make an amplifier of a signal value input to an analog front end circuit at a subsequent stage small, and to suppress an occurrence of white saturation in the signal value after the addition by selecting the second addition read mode at a scene of which exposure is bright. Besides, it is possible for the solid state imaging device to acquire an image with the SN ratio higher than the case of the second addition read mode by selecting the first addition read mode in a scene of which exposure is dark.

Description of Another Embodiment

Figure 16:
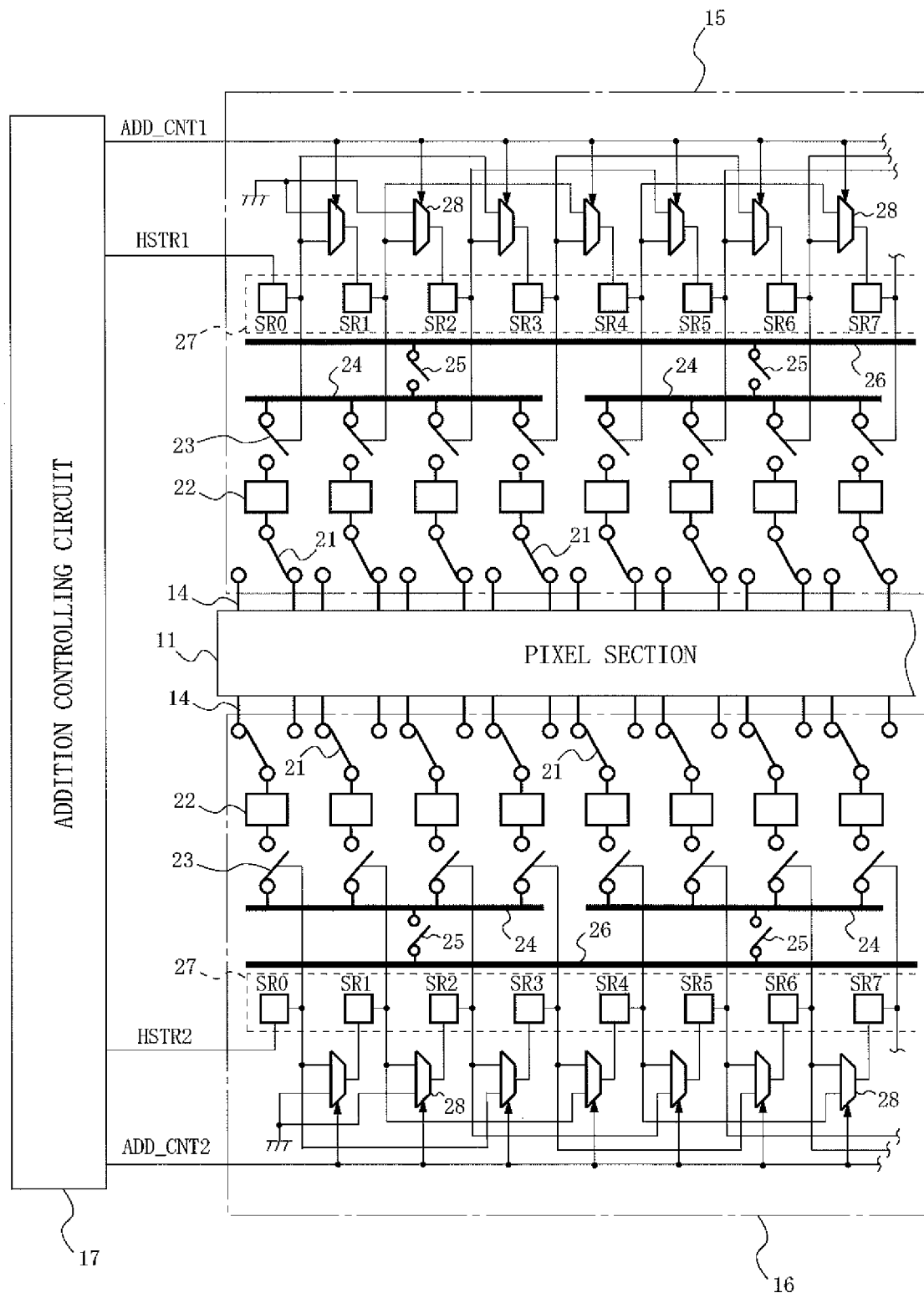
FIG. 16 is a view illustrating a configuration example of a first signal outputting circuit, a second signal outputting circuit, and an addition controlling circuit in another embodiment.

FIG. 16 is a view illustrating a configuration example of the first signal outputting circuit 15, the second signal outputting circuit 16, and the addition controlling circuit 17 in another embodiment. Note that the other embodiment is a modified example of the one embodiment, and FIG. 16 corresponds to the above-stated FIG. 3. Accordingly, a redundant description as for configurations in common with the one embodiment is not given relating to the configuration of the other embodiment.

The addition controlling circuit 17 in the other embodiment inputs an ADD_CNT1 and an HSTR1 to the first signal outputting circuit 15, and inputs an ADD_CNT2 and an HSTR2 to the second signal outputting circuit 16. The ADD_CNT1 is input to each multiplexer 28 of the first signal outputting circuit 15. Besides, the HSTR1 is input to the register circuit SR0 of the first signal outputting circuit 15. The ADD_CNT2 is input to each multiplexer 28 of the second signal outputting circuit 16. Besides, the HSTR2 is input to the register circuit SR0 of the second signal outputting circuit 16. Besides, the second input terminals of the multiplexers 28 at the first and the second stage are each grounded at the first signal outputting circuit 15 and the second signal outputting circuit 16 of the other embodiment.

Hereinafter, an operation example in the addition read mode at the solid state imaging device according to the other embodiment is described. In this addition read mode, a signal reading is performed in the similar pattern as the above-stated FIG. 6.

Figure 17:
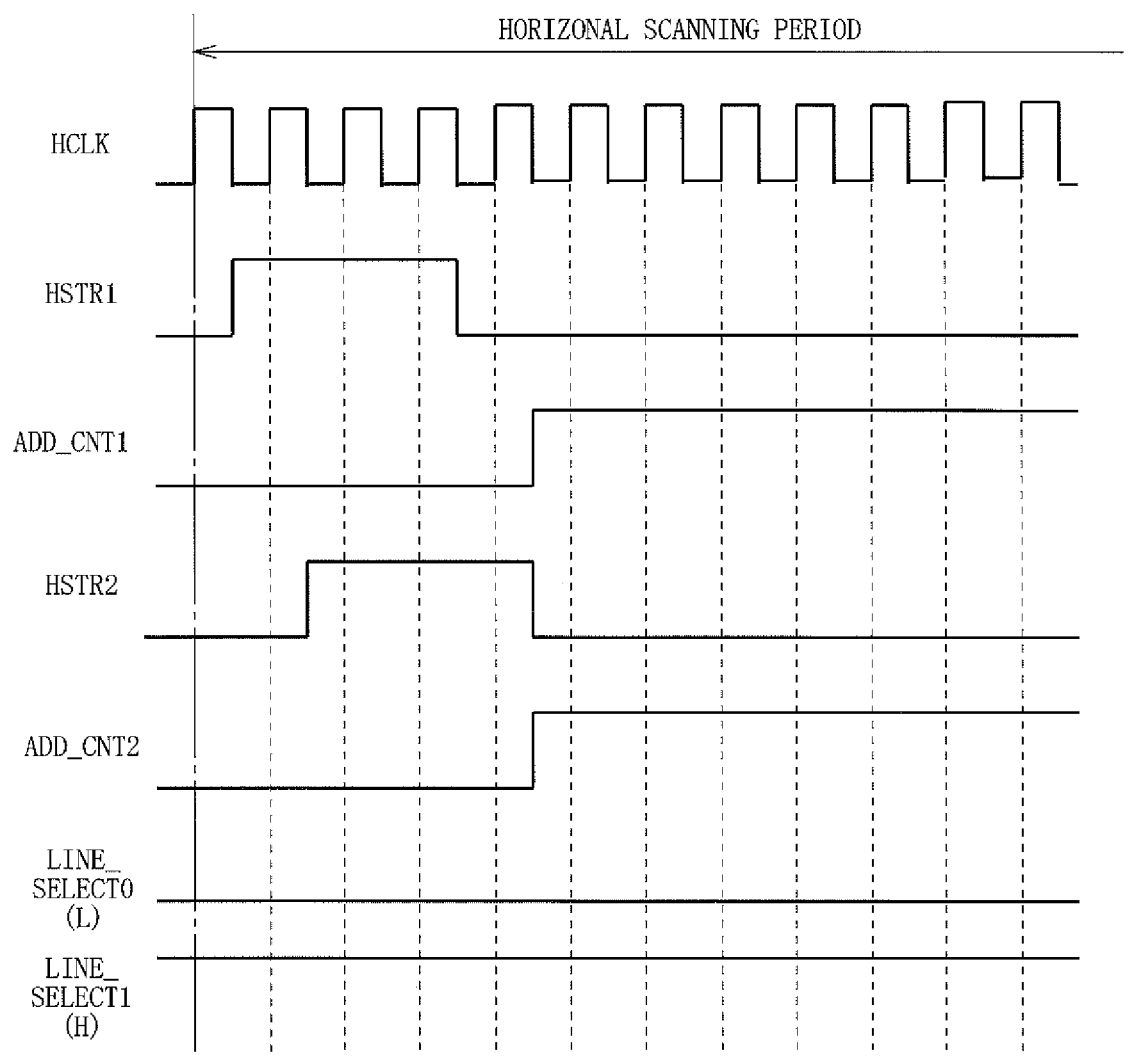
FIG. 17 is a timing chart when the odd number row is read in an addition read mode in the other embodiment.

FIG. 17 is a timing chart when the odd number row is read in the addition read mode in the other embodiment. Note that in the following description according to the other embodiment, a sampling of a signal is performed at a rising timing of the HCLK being a clock signal.

In FIG. 17, the LINE_SELECT0 is constantly in low-level, and the LINE_SELECT1 is constantly in high-level. Accordingly, the first signal outputting circuit 15 reads signals of Gb pixels from a line to be read, and the second signal outputting circuit 16 reads signals of B pixels from the line to be read.

Besides, pulse signal for three cycles is input to the HSTR2 under a state in which the ADD_CNT2 is in low-level. The ADD_CNT2 changes into high-level after two cycles since the input of the pulse signal to the HSTR2.

Besides, the pulse signal for three cycles is input to the HSTR1 under a state in which the ADD_CNT1 is in low-level. Note that the pulse signal of the HSTR1 delays for one cycle than the pulse signal of the HSTR2. The ADD_CNT1 changes into high-level after one cycle since the input of the pulse signal to the HSTR1.

Accordingly, the pulse of the HSTR2 is sequentially input to the next register circuit via the first input terminal of the multiplexer 28 until they are all input to the register circuits SR1 to 3 in the second signal outputting circuit 16. After that, every three register circuits of the shift register 27 are sequentially turned on from left to right in the drawing in accordance with switching of the ADD_CNT2, and the signals of the B pixels in the line to be read are addition read three by three.

On the other hand, the pulse of the HSTR1 is sequentially input to the next register circuit via the first input terminal of the multiplexer 28 until they are all input to the register circuits SR0 to 2 in the first signal outputting circuit 15. After that, every three register circuits of the shift register 27 are sequentially turned on from left to right in the drawing in accordance with switching of the ADD_CNT1, and the signals of the Gb pixels in the line to be read are addition read three by three.

Figure 18:
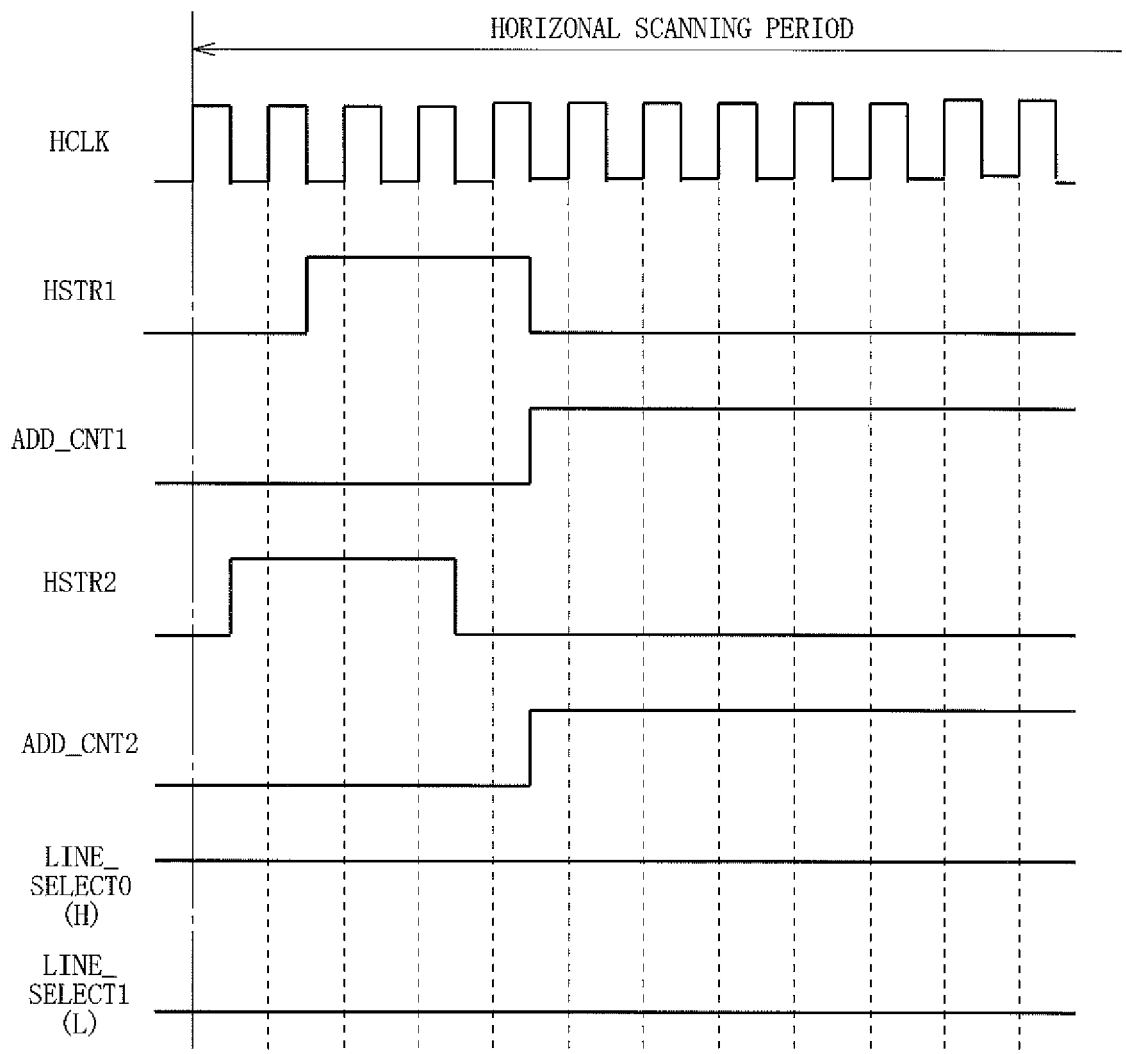
FIG. 18 is a timing chart when the even number row is read in the addition read mode in the other embodiment.

FIG. 18 is a timing chart when the even number row is read in the addition read mode in the other embodiment.

In FIG. 18, the LINE_SELECT0 is constantly in high-level, and the LINE_SELECT1 is constantly in low-level. Accordingly, the first signal outputting circuit 15 reads the signals of the Gr pixels from the line to be read, and the second signal outputting circuit 16 reads the signals of the R pixels from the line to be read.

Besides, the pulse signal for three cycles is input to the HSTR1 under the state in which the ADD_CNT1 is in low-level. The ADD_CNT1 changes into high-level after two cycles since the input of the pulse signal to the HSTR1.

Besides, the pulse signal for three cycles is input to the HSTR2 under the state in which the ADD_CNT2 is in low-level. Note that the pulse signal of the HSTR2 delays for one cycle than the pulse signal of the HSTR1. The ADD_CNT2 changes into high-level after one cycle since the input of the pulse signal to the HSTR2.

Accordingly, the pulse of the HSTR1 is sequentially input to the next register circuit via the first input terminal of the multiplexer 28 until they are all input to the register circuits SR1 to 3 in the first signal outputting circuit 15. After that, every three register circuits of the shift register 27 are sequentially turned on from left to right in the drawing in accordance with switching of the ADD_CNT1, and the signals of the Gr pixels in the line to be read are addition read three by three.

On the other hand, the pulse of the HSTR2 is sequentially input to the next register circuit via the first input terminal of the multiplexer 28 until they are all input to the register circuits SR0 to 2 in the second signal outputting circuit 16. After that, every three register circuits of the shift register 27 are sequentially turned on from left to right in the drawing in accordance with switching of the ADD_CNT2, and the signals of the R pixels in the line to be read are addition read three by three.

As stated above, the solid state imaging device according to the other embodiment is able to obtain almost the similar operation and effect as the first addition read mode in the solid state imaging device according to the one embodiment.

Configuration Example of Imaging Apparatus

Figure 19:
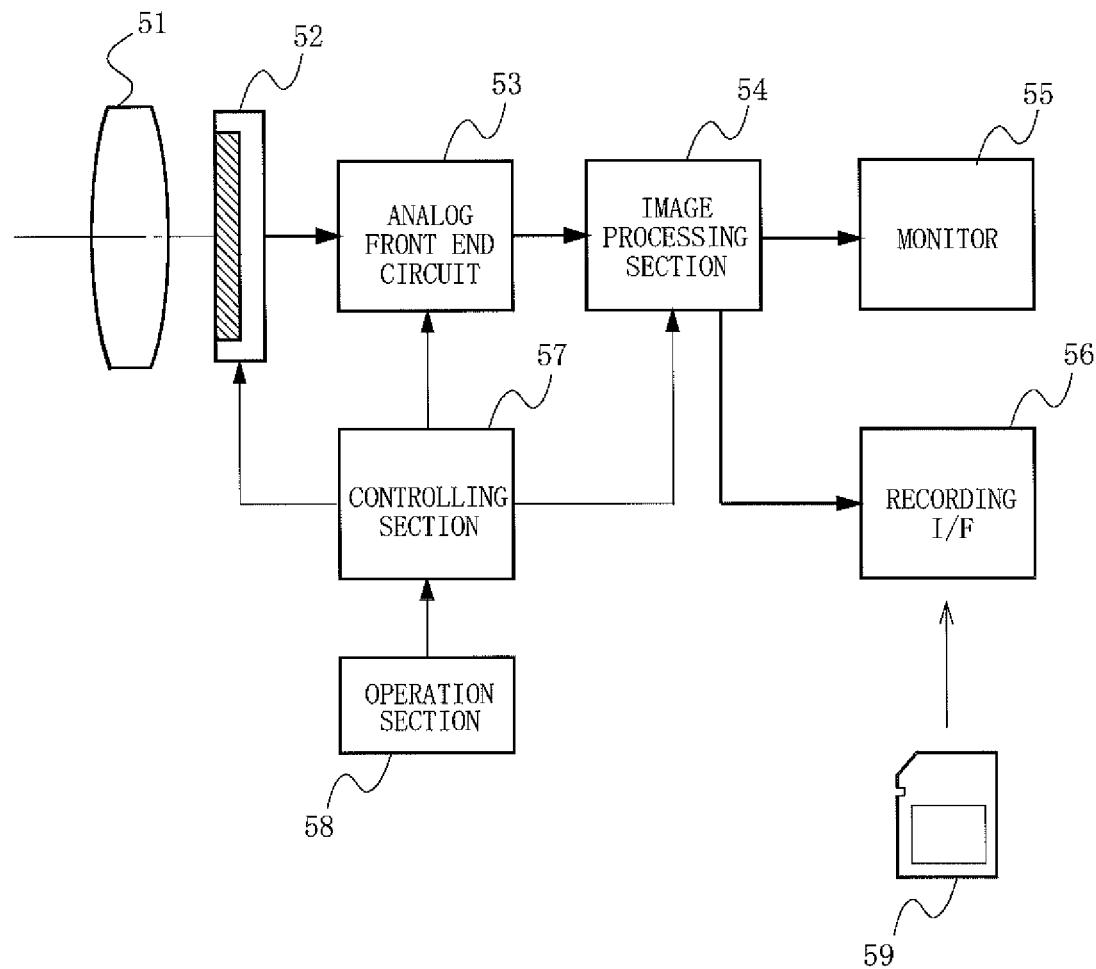
FIG. 19 is a view illustrating a configuration example of a digital camera being an example of an imaging apparatus.

FIG. 19 is a view illustrating a configuration example of a digital camera being an example of an imaging apparatus.

The digital camera includes an imaging optical system 51, a solid state imaging device 52 according to the one embodiment or the other embodiment, an analog front end circuit 53 (AFE circuit), an image processing section 54, a monitor 55, a recording I/F 56, a controlling section 57, and an operation section 58. Here, the solid state imaging device 52, the analog front end circuit 53, the image processing section 54, and the operation section 58 are each coupled to the controlling section 57.

The imaging optical system 51 is made up of plural lenses including, for example, a zoom lens and a focus lens. Note that the imaging optical system 51 is illustrated by a piece of lens in FIG. 19 for easy to understanding.

The solid state imaging device 52 captures an imaging of a subject by a luminous flux transmitting the imaging optical system 51. An output of the imaging device is coupled to the analog front end circuit 53.

The solid state imaging device 52 photographs a still image and a moving image for recording accompanying a record to a nonvolatile storage medium (59) in accordance with an input of the operation section 58 in a photographing mode of the digital camera. Besides, the solid state imaging device 52 continuously photographs an image for observation (through image) with a predetermined interval also at a photographing stand-by time of the still image for recording. Data of the through image (or data of the above-stated moving image) acquired in time series are used for a moving image display on the monitor 55 and various calculation processes by a CPU. Note that the digital camera may be set to record the through image at the moving image photographing time.

The analog front end circuit 53 is a circuit sequentially performing an analog signal processing and an A/D conversion processing for the image signal input in a pipeline manner. An output of the analog front end circuit 53 is coupled to the image processing section 54.

The image processing section 54 performs image processing (color interpolation, gradation conversion processing, edge enhancement processing, white balance adjustment, and so on) for digital image signals input from the analog front end circuit 53. Note that the monitor 55 and the recording I/F 56 are coupled to the image processing section 54.

The monitor 55 is a display device displaying various images. For example, the monitor 55 performs a moving image display of the through image (view finder display) under the photographing mode by a control of the controlling section 57.

The recording I/F 56 includes a connector to couple nonvolatile storage medium 59. The recording I/F 56 executes writing/reading of data to/from the storage medium 59 coupled to the connector. The storage medium 59 is made up of a hard-disk, a memory card housing a semiconductor memory, and so on. Note that a memory card is illustrated in FIG. 19 as an example of the storage medium 59.

The controlling section 57 is a processor totally controlling operations of the digital camera. The controlling section 57 instructs the solid state imaging device 52 to perform the all pixel reading at, for example, the acquisition time of the still image for recording. Besides, the controlling section 57 instructs the solid state imaging device 52 to perform the addition read at the acquisition time of the through image and the moving image for recording.

The operation section 58 receives an acquisition instruction of the still image for recording (for example, a full press operation of a release button) and a mode switching operation between the photographing mode of the still image and the photographing mode of the moving image from a user.

The above-stated digital camera uses the solid state imaging device 52 of the one embodiment or the other embodiment, and therefore, it is possible to perform the addition read of the image signals by each color from the solid state imaging device 52 without displacement of the barycenter position of each color pixel after the addition at the acquisition time of the moving image or the through image.

Supplementary Items of Embodiments

The example of the color filters in the Bayer array is described in the solid state imaging device of the above-stated embodiments. However, the solid state imaging device of the present invention is not limited to the addition read by a color filter array in the Bayer array, but it can be widely applied for an addition read of a solid state imaging device including the other four-color filter array of two rows and two columns (for example, a complementary color filter, or the like using magenta, green, cyan, and yellow).

Besides, the number of pixels added in the first addition read mode and the number of pixels added in the second addition read mode may be appropriately changed in the one embodiment.

Besides, the example in which one pixel is made up of four transistors is described in the solid state imaging device of the above-stated embodiments. However, the solid state imaging device of the present invention may be the one in which the reset transistor RES, the amplifier transistor AMP, and the selection transistor SEL are shared among plural pixels (for example, a 2.5 Tr architecture including five transistors by two pixels, or a 1.75 Tr architecture including seven transistors by four pixels).

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A solid state imaging device, comprising:
a pixel section including (i) a plurality of first pixels, which are each configured to output a first signal generated by light from a first filter having a first spectral characteristic, and (ii) a plurality of second pixels, which are each configured to output a second signal generated by light from a second filter having a second spectral characteristic;
a first outputting circuit configured to add the first signals output from the plurality of first pixels;
a second outputting circuit configured to add the second signals output from the plurality of second pixels; and
an addition controlling circuit configured to control the first outputting circuit and the second outputting circuit to shift a sampling position of first pixels among the plurality of first pixels whose first signals are to be added by the first outputting circuit and a sampling position of second pixels among the plurality of second pixels whose second signals are to be added by the second outputting circuit.

2. The solid state imaging device according to claim 1, wherein
the plurality of first pixels and the plurality of second pixels of the pixel section are arranged in a matrix,
each of the first outputting circuit and the second outputting circuit includes a shift register sequentially specifying at a line of the pixel section the first pixels among the plurality of first pixels and the second pixels among the plurality of second pixels whose signals are to be added, and
the addition controlling circuit shifts an addition start position of the shift register of the first outputting circuit and an addition start position of the shift register of the second outputting circuit.

3. The solid state imaging device according to claim 1, wherein
the addition controlling circuit is configured to select between a first addition mode and a second addition mode, barycenter positions of the first pixels and the second pixels whose signals are to be added matching each other in the first and second addition modes but numbers of the first pixels and the second pixels whose signals are to be added differing between the first and second addition modes.

4. The solid state imaging device according to claim 1, wherein
the plurality of first pixels and the plurality of second pixels of the pixel section are arranged in a matrix, and
dummy pixels are provided at one end of a line of the pixel section at which are located the first pixels and the second pixels whose signals are to be added to compensate for lacking pixels at a time of the addition at the first outputting circuit and the second outputting circuit.

5. An imaging apparatus, comprising:
the solid state imaging device according to claim 1; and
a controlling section instructing the solid state imaging device to perform an all pixel reading at a time of a still image acquisition and instructing the solid state imaging device to perform the addition at the first and second outputting circuits at a time of a moving image acquisition.

* * * * *